US012634321B1

(12) United States Patent
Fulton et al.

(10) Patent No.: US 12,634,321 B1
(45) Date of Patent: May 19, 2026

(54) LARGE LANGUAGE MODEL BASED SECURITY INSIGHTS

(71) Applicant: Lucidum Inc., Cincinnati, OH (US)

(72) Inventors: Joel M. Fulton, Cincinnati, OH (US); Jeremy Sherwood, Beaverton, OR (US); Shuning Wu, Mountain View, CA (US)

( * ) Notice: Subject to any disclaimer, the term of this patent is extended or adjusted under 35 U.S.C. 154(b) by 0 days.

(21) Appl. No.: 19/247,953

(22) Filed: Jun. 24, 2025

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01); *H04L 63/1433* (2013.01)

(58) Field of Classification Search
CPC .. H04L 63/1425; H04L 63/1433; H04L 41/16
See application file for complete search history.

(56) References Cited

U.S. PATENT DOCUMENTS

| | | | | |
|---|---|---|---|---|
| 11,418,538 | B2 * | 8/2022 | Hutchinson | H04L 63/1466 |
| 11,509,675 | B2 * | 11/2022 | Srivastav | H04L 67/12 |
| 11,522,888 | B2 * | 12/2022 | Salvat Lozano | H04L 63/1433 |
| 12,095,807 | B1 * | 9/2024 | Arbel | G06F 21/554 |
| 2015/0047046 | A1 * | 2/2015 | Pavlyushchik | H04L 63/1433 |
| | | | | 726/25 |
| 2016/0255105 | A1 * | 9/2016 | Palazzo | H04L 63/1416 |
| | | | | 726/23 |
| 2016/0261616 | A1 * | 9/2016 | Shulman | H04L 63/10 |

| | | | | |
|---|---|---|---|---|
| 2017/0180318 | A1 * | 6/2017 | Lutas | H04L 63/14 |
| 2017/0244730 | A1 * | 8/2017 | Sancheti | H04L 63/205 |
| 2023/0164567 | A1 * | 5/2023 | Fellows | H04L 41/16 |
| | | | | 455/410 |
| 2023/0188549 | A1 * | 6/2023 | Willoughby | G06N 3/044 |
| | | | | 726/23 |
| 2023/0291755 | A1 * | 9/2023 | Siebel | H04L 63/1416 |
| 2024/0098103 | A1 * | 3/2024 | Knopp | H04L 63/1416 |
| 2024/0291853 | A1 * | 8/2024 | Murphy | G06F 40/154 |
| 2024/0422173 | A1 * | 12/2024 | Koopmans | H04L 43/067 |

(Continued)

FOREIGN PATENT DOCUMENTS

| | | | | | |
|---|---|---|---|---|---|
| CN | 118869325 A | * | 10/2024 | ........ | H04L 63/1416 |
| NL | 2020634 B1 | * | 9/2019 | ........ | H04L 63/1408 |

(Continued)

*Primary Examiner* — Sarah Su
(74) *Attorney, Agent, or Firm* — Holland & Hart LLP

(57) ABSTRACT

Methods, systems, and devices for large language model (LLM) based security insights and/or recommendations at a data security system are described. A data security system may obtain event information associated with monitored computing assets and/or user accounts for a client or customer of the data security system. The data security system may filter the event information and associated computing asset and/or user account information in accordance with a security policy for the client and may generate a prompt for an LLM based on the filtered event and computing asset and/or user account information. The data security system may provide the prompt to the LLM, and the LLM may provide a natural language response to the prompt that provides a security action recommendation to resolve one or more events and/or insights such as a rationale for the security action recommendation and/or an explanation of threats associated with the event.

22 Claims, 10 Drawing Sheets

(56)         References Cited

U.S. PATENT DOCUMENTS

| | | | |
|---|---|---|---|
| 2025/0113195 A1* | 4/2025 | Fellows ................ | H04L 63/145 |
| 2025/0202760 A1* | 6/2025 | Sanchez .............. | H04L 41/0631 |
| 2025/0202762 A1* | 6/2025 | Izquierdo Franco ... | H04L 41/16 |
| 2025/0247303 A1* | 7/2025 | Lei ...................... | G06F 16/9038 |
| 2025/0267155 A1* | 8/2025 | Fonseca .............. | H04L 63/1416 |
| 2025/0274469 A1* | 8/2025 | Bar On .............. | H04L 63/1425 |

FOREIGN PATENT DOCUMENTS

| | | | | |
|---|---|---|---|---|
| WO | WO-2025059476 A1 * | 3/2025 | ........ | H04L 63/1425 |
| WO | WO-2025099548 A1 * | 5/2025 | .......... | G06F 11/3692 |

* cited by examiner

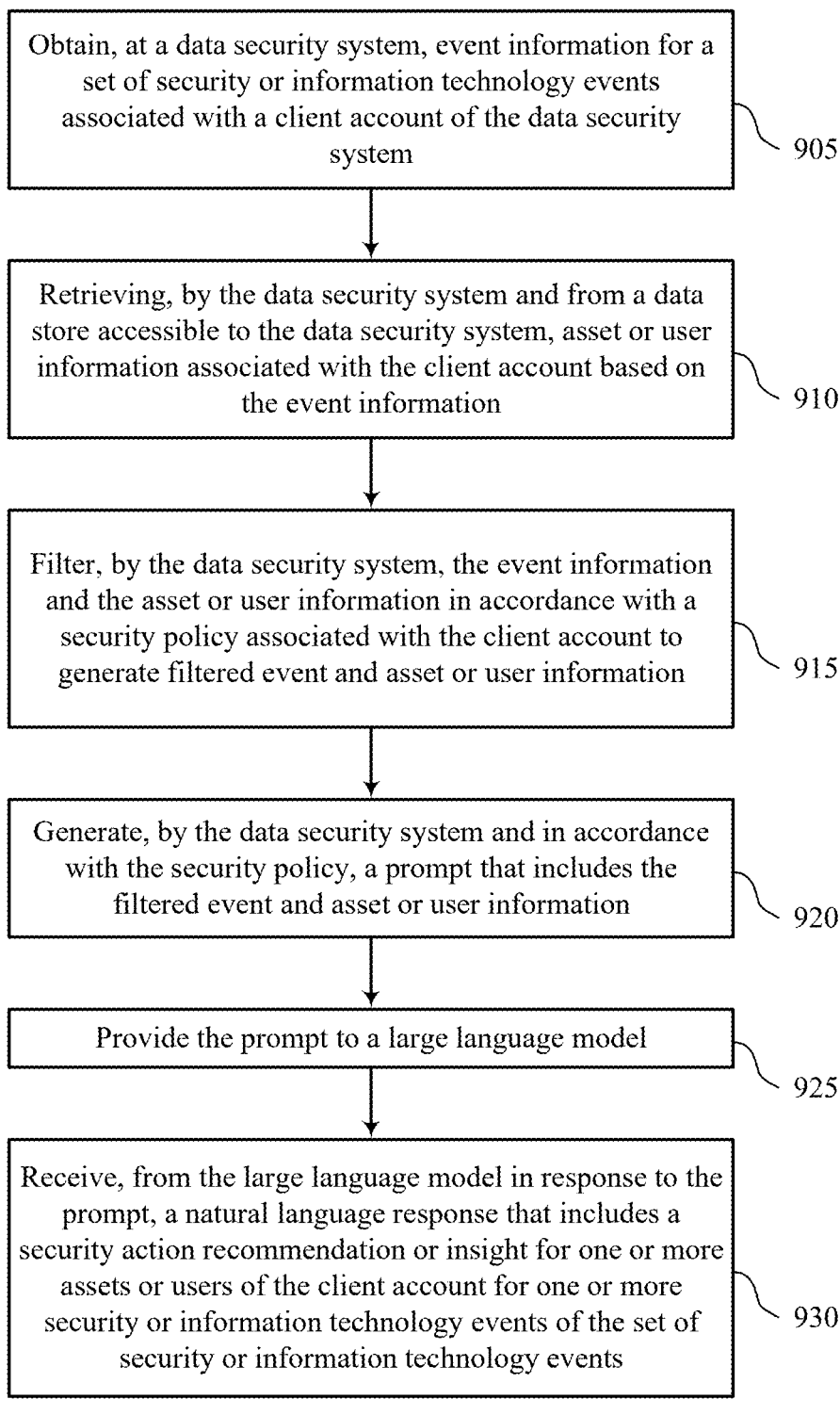

Obtain, at a data security system, event information for a set of security or information technology events associated with a client account of the data security system

905

Retrieving, by the data security system and from a data store accessible to the data security system, asset or user information associated with the client account based on the event information

910

Filter, by the data security system, the event information and the asset or user information in accordance with a security policy associated with the client account to generate filtered event and asset or user information

915

Generate, by the data security system and in accordance with the security policy, a prompt that includes the filtered event and asset or user information

920

Provide the prompt to a large language model

925

Receive, from the large language model in response to the prompt, a natural language response that includes a security action recommendation or insight for one or more assets or users of the client account for one or more security or information technology events of the set of security or information technology events

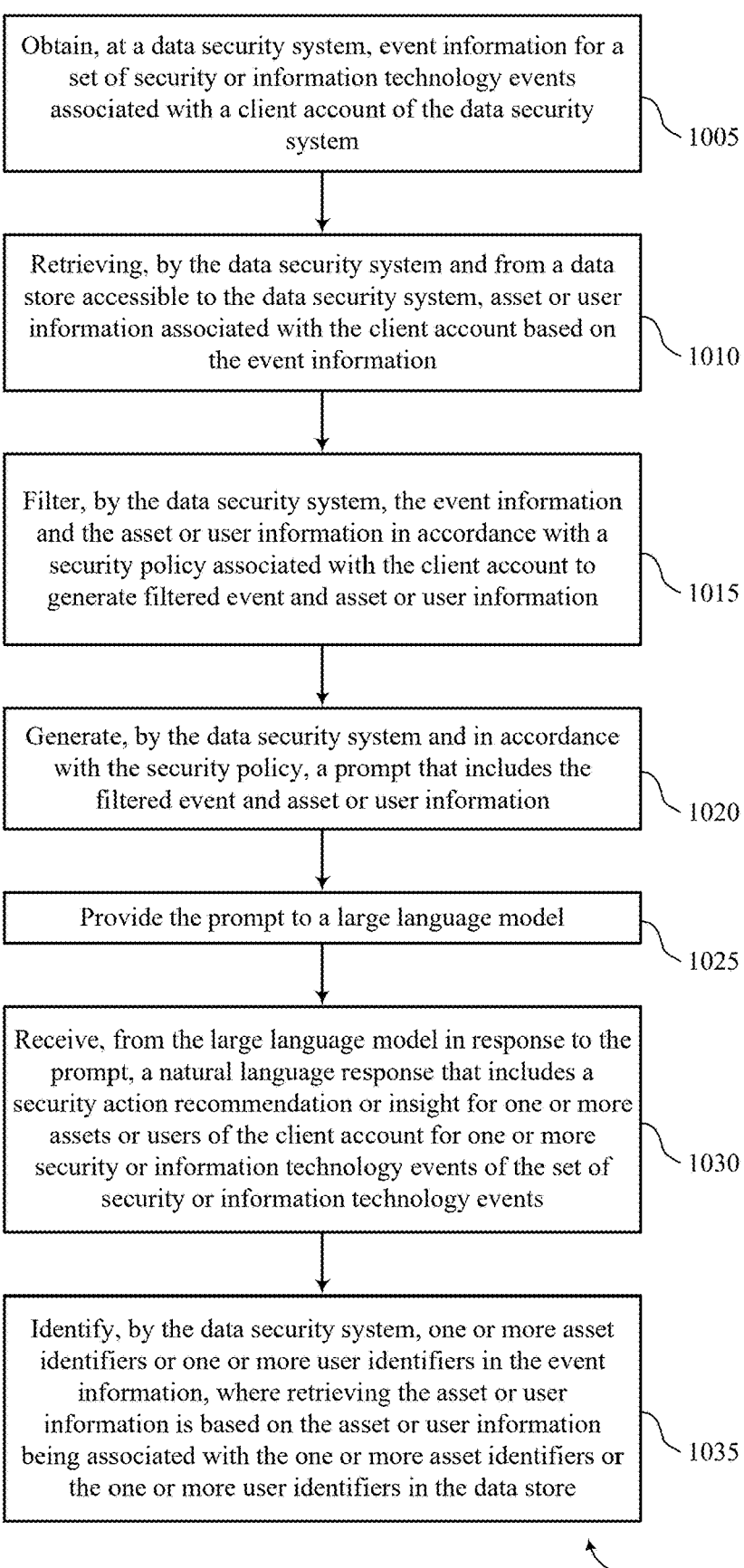

Obtain, at a data security system, event information for a set of security or information technology events associated with a client account of the data security system
1005

Retrieving, by the data security system and from a data store accessible to the data security system, asset or user information associated with the client account based on the event information
1010

Filter, by the data security system, the event information and the asset or user information in accordance with a security policy associated with the client account to generate filtered event and asset or user information
1015

Generate, by the data security system and in accordance with the security policy, a prompt that includes the filtered event and asset or user information
1020

Provide the prompt to a large language model
1025

Receive, from the large language model in response to the prompt, a natural language response that includes a security action recommendation or insight for one or more assets or users of the client account for one or more security or information technology events of the set of security or information technology events
1030

Identify, by the data security system, one or more asset identifiers or one or more user identifiers in the event information, where retrieving the asset or user information is based on the asset or user information being associated with the one or more asset identifiers or the one or more user identifiers in the data store
1035

LARGE LANGUAGE MODEL BASED SECURITY INSIGHTS

FIELD OF TECHNOLOGY

The present disclosure relates generally to data systems and data processing, and more specifically to large language model based security insights.

BACKGROUND

A data security system may be employed to detect and manage data security risks associated with one or more computing assets. The data monitored by the data security system may be generated, stored, or otherwise used by the one or more computing assets, examples of which may include mobile phones, tablet computers, personal computers, servers, databases, virtual machines, cloud computing systems, file systems (e.g., network-attached storage (NAS) systems), or other data storage or processing systems. For example, a data security system may monitor for malware and/or suspicious activity within the one or more computing assets. In some examples, a data security system may receive indications of known types of malware from one or more malware information sources. The data security system may monitor the one or more computing assets for the known types of malware.

BRIEF DESCRIPTION OF THE DRAWINGS

FIGS. 9 and 10 show flowcharts illustrating methods that support LLM based security insights in accordance with aspects of the present disclosure.

DETAILED DESCRIPTION

Figure 1:
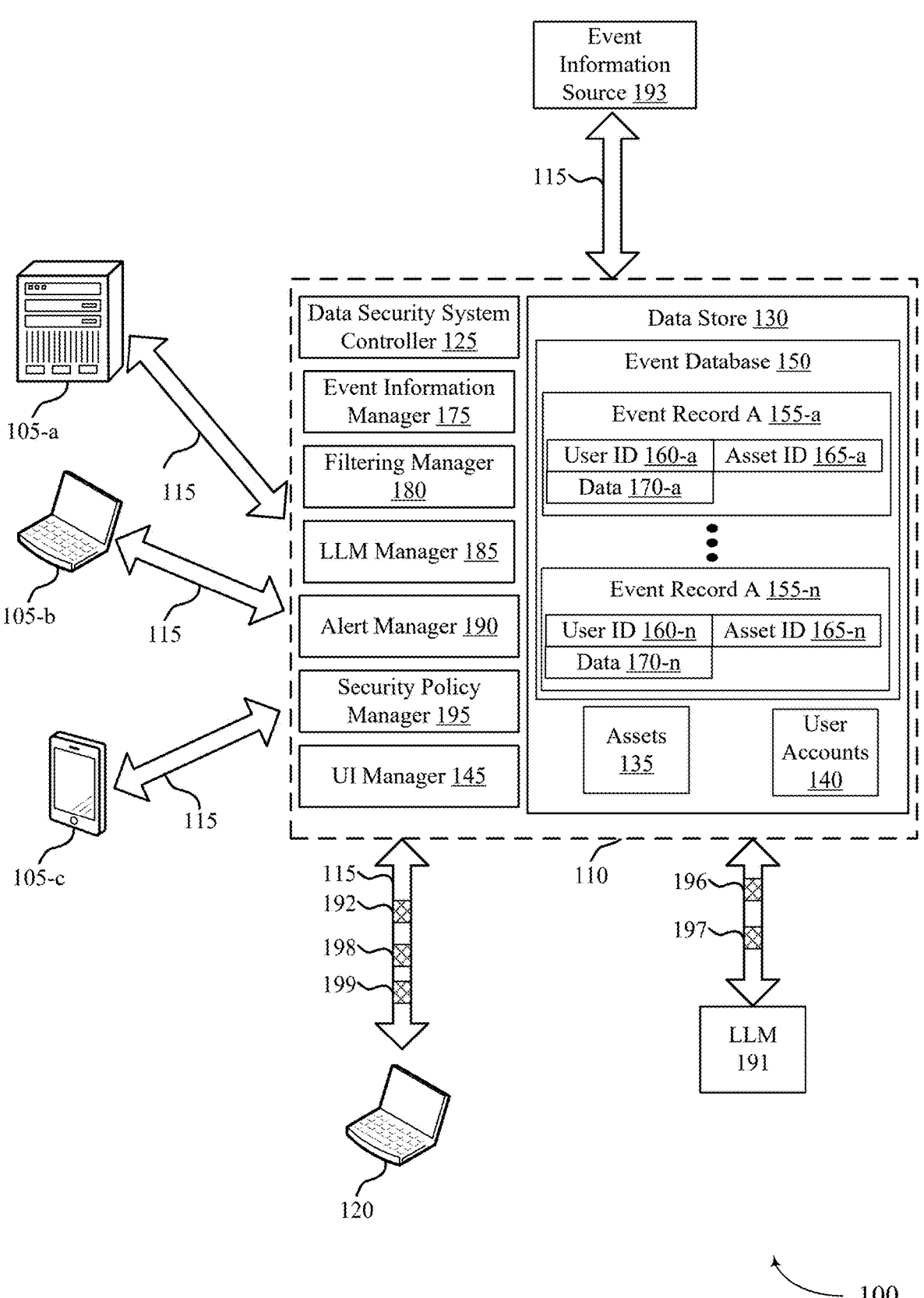
FIG. 1 illustrates an example of a computing environment that supports large language model (LLM) based security insights in accordance with aspects of the present disclosure.

A data security system may be employed to monitor for and manage data security risks associated with one or more computing assets. For example, the one or more computing assets may be associated with an entity which may be a client of the data security system (e.g., a customer or subscriber of the data security system). For example, an entity may be an individual or an organization. A computing asset may be any device, physical or virtual, capable of processing, storing, transmitting, and/or receiving data. For example, a computing asset may be a stationary device (e.g., a desktop computer or access point) or a mobile device (e.g., a laptop computer, a tablet computer, or a smart phone). As another example, a computing asset may be a commercial computing device, such as a server or collection of servers. In some examples, a computing asset may be a virtual device (e.g., a virtual machine). In some examples, the data security system may scan (e.g., periodically or on-demand) or may otherwise monitor for security risks based on computing objects (e.g., files, software applications, or any other programming elements) stored at or accessible to the computing assets. For example, the data security system may store a listing of known malware, and the data security system may monitor for the known malware within the computing assets monitored by the data security system. As another example, a data security system may monitor for suspicious activity on or associated with one or more computing assets. For example, the data security system may track which user accounts access and/or otherwise use computing assets, and the data security system may track unauthorized access to computing assets or computing resources. In some examples, the data security system may track information technology (IT) information for monitored assets. For example, such IT information may include performance type information (e.g., central processing unit (CPU) usage, memory usage, upload/download rates) and/or state information (e.g., powered on, powered off, in a sleep or energy saving mode, network connection state).

In some cases, the data security system may be responsible for hundreds or thousands of physical and virtual computing assets across multiple networks that may collectively generate thousands or millions of data records. For example, the data security system may obtain security or IT type event information for computing assets and/or users of a client (e.g., a customer or subscriber) of the data security system. For example, the data security system may obtain security information and event management (SIEM) type information for computing assets and users monitored by the data security system. For example, security type event information that may be obtained by the data security system (e.g., as data records or log files) may include incident reports for the detection of suspicious activity or malware. As another example, security type event information that may be obtained by the data security system may include information such as records or logs of scans of computing assets (e.g., which may or may not reveal suspicious activity). As another example, security type event information that may be obtained by the data security system may include records or logs of actions performed by the data security system, such as blocking the download of a virus or removal of a virus or malware from a computing asset. As another example, security type event information that may be obtained by the data security system may include records of log in attempts or access attempts for a particular computing asset (e.g., and whether such access is authorized). As another example, IT type event information that may be obtained by the data security system may include the addition or deletion of a computing asset to an organization or a network. As another example, IT type event information that may be obtained by the data security system may include computing asset performance information (e.g., a computing asset's CPU usage exceeds a threshold percentage, a computing asset's upload or download speed is below a threshold rate, a computing asset's memory usage exceeds a threshold percentage, a computing asset's power usage exceeds a threshold percentage). The data security system may store records of event information for monitored organizations in one or more databases.

The data security system may obtain such event information from multiple data information sources (e.g., log files from the monitored computing assets themselves, from third party security systems, from SIEM systems of the client). For example, a malware protection program may generate log files based on scans of computing assets. As another example, an access control system may generate data files based on users accessing computing assets monitored by the data security system. As another example, different types of computing assets may use different malware protection programs (e.g., a first malware protection program may manage computing assets that use a first operating system and a second malware protection may manage computing assets that use a second operating system), which may each generate log files. The event information sources may provide data records such as log files to the data security system in different formats (e.g., in different file formats or different data/structure formats). Such data records for event information may be in formats that are not easily human-readable.

In accordance with aspects of this disclosure, the data security system may leverage large language model(s) (LLMs) to provide natural language recommendations in response to event information provided to the LLM. Such natural language recommendations may be provided to administrators of the data security system or security or IT teams of the client of the data security system. For example, the data security system may filter event information to identify one or more events and one or more computing assets or users associated with the events. For example, a security policy or service level agreement with a particular client may indicate for which types of events, which computing assets, and/or which users to provide recommendations (e.g., based on which events, computing assets, and/or user accounts are most important to or most relevant to the client). The data security system may generate a prompt for an LLM based on the one or more events and one or more computing assets or users associated with the events. For example, to generate a prompt, the data security system may filter information from log files to extract information that identifies the type of event and affected computing asset(s) and/or user(s). The prompt may be provided to the LLM, which may provide a natural language response that indicates a recommended action for the type of event and the affected computing asset(s) and/or user(s). For example, the LLM may be trained on or provided a security policy for a given client which indicates types of recommended actions for given events for given types of computing assets and/or types of users.

Aspects of the disclosure are initially described in the context of an environment supporting an on-demand database service. Aspects of the disclosure are further illustrated by and described with reference to computing environments, flow diagrams, user interface (UI) views, process flows, apparatus diagrams, system diagrams, and flowcharts that relate to LLM based security insights.

FIG. 1 illustrates an example of a computing environment 100 that supports LLM based security insights in accordance with various aspects of the present disclosure.

The computing environment 100 includes one or more computing assets 105 (e.g., a computing asset 105-*a*, a computing asset 105-*b*, and a computing asset 105-*c*) that are monitored or protected by a data security system 110. Although shown as three computing assets 105, the data security system 110 may monitor any quantity of computing assets. The data security system 110 may communicate with the one or more computing assets 105 via communication links 115 (e.g., via a network connection). For example, the network may implement transfer control protocol and internet protocol (TCP/IP), such as the Internet, or may implement other network protocols. For example, the communication links 115 may include aspects of one or more wired networks (e.g., the Internet), one or more wireless networks (e.g., cellular networks), or any combination thereof. The communication links 115 may include aspects of one or more public networks or private networks, as well as secured or unsecured networks, or any combination thereof. The communication links 115 also may include any quantity of communications links and any quantity of hubs, bridges, routers, switches, ports or other physical or logical network components.

As described herein, a computing asset 105 may be any device, physical or virtual, capable of analyzing, storing, generating, and transmitting or receiving data. For example, a computing asset 105 may be a desktop computer, an access point, a personal digital assistant (PDA), a laptop computer, a tablet computer, a smartphone, a server, a collection of servers, a database, a data store, a virtual machine, or any combination thereof.

For example, a virtual machine may run various applications, such as a database server, an application server, or a web server. For example, a server may be used to host (e.g., create, manage) one or more virtual machines, and a computing system manager may manage a virtualized infrastructure within a computing system and perform management operations associated with the virtualized infrastructure. A computing system manager may manage the provisioning of virtual machines running within the virtualized infrastructure and provide an interface to a computing asset 105 interacting with the virtualized infrastructure. For example, the computing system manager may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of a disk of a computing system, the memory of a computing system, the processor of a computing system, the network interface of a computing system, the data storage device of a computing system, or any combination thereof in support of running the various applications. Storage resources that are virtualized may be accessed by applications as a virtual disk.

The data security system 110 may be implemented on one or more servers. The data security system 110 may include a data store 130 (e.g., one or more databases) that may include one or more servers. For example, a server may allow a client (e.g., a computing asset 105 or the data security system controller 125) to download information or files (e.g., executable, text, application, audio, image, or video files) from the server, to upload such information or files to the server, or to perform a search query related to particular information stored by the server. In general, a server may refer to one or more hardware devices that act as the host in a client-server relationship or a software process that shares a resource with or performs work for one or more clients The data store 130 may be used for data storage, management, and processing. The data store 130 may utilize multiple redundancies for security purposes. In some cases, the data stored at data store 130 may be backed up by copies of the data at a different data center (not pictured).

The data security system 110 may include a data security system controller 125, a UI manager 145, an event information manager 175, a filtering manager 180, an LLM manager 185, an alert manager 190, and/or a security policy manager 195. The data security system controller 125 may manage operation of the data security system 110, including the data store 130, the UI manager 145, the event information manager 175, the filtering manager 180, the LLM manager 185, the alert manager 190, and/or the security policy manager 195. Though illustrated as a separate entity within the data security system 110, the data security system controller 125 may in some cases be implemented (e.g., as a software application) by one or more of servers of the data store 130. Though illustrated as a separate entities, the UI manager 145, the event information manager 175, the filtering manager 180, the LLM manager 185, the alert manager 190, and/or the security policy manager 195 may be implemented (e.g., as a software application) by the data security system controller 125.

In some examples, an administrative user of the data security system 110 and/or an administrative user of a client of the data security system 110 (e.g., an IT or security manager or officer of the client) may interact with the data security system 110 using a computing device 120. The computing device 120 may communicate with the data security system 110 via a communication link 115 as described herein. The computing device 120 may be a user device that may be used to input information to or receive information from the data security system 110. In some examples, the computing device 120 may be a computing asset 105 monitored by the data security system 110. A user of the computing device 120 may provide user inputs via the computing device 120, which may result in commands, data, or any combination thereof being communicated via the communication link 115 to the data security system 110. A user of a computing device 120 may, for example, use the computing device 120 to interact with one or more UIs (e.g., graphical user interfaces (GUIs)) to operate or otherwise interact with the data security system 110.

In some examples, the data security system 110, or aspects thereof, may be implemented within one or more cloud computing environments, which may alternatively be referred to as cloud environments. Cloud computing may refer to Internet-based computing, where shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the data security system 110, or aspects thereof, for example, through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing assets 105 over the communication links 115). IaaS may refer to a service in which physical computing resources are used to instantiate one or more virtual machines, the resources of which are made available to one or more client devices over a network (e.g., to one or more computing assets 105 over the communication links 115)

As described herein, the data security system 110 may provide data/information security services to the computing assets 105. For example, the computing assets 105 may be associated with one or more clients of the data security system 110. For example, the data security system 110 may store (e.g., in the data store 130), a listing of known malware. The data security system 110 may scan the computing assets 105 (e.g., periodically or on-demand) for malware based on the listing of known malware. In some examples, the event information manager 175 may receive logs of scan events for malware scans. As another example, the data security system 110 may monitor for suspicious activity (e.g., unauthorized access to a computing device by a user account or downloading of suspicious software such as viruses or other malware). For example, the data store 130 may store user account information in a user account listing 140 which may indicate permissions for user accounts associated with an entity for computing assets 105 associated with the entity. In some examples, the event information manager 175 may receive event information such as log files indicating when a particular user account accesses a particular computing asset 105.

The data security system 110 may be responsible for hundreds or thousands of physical and virtual computing assets 105 across multiple networks that may collectively generate thousands or millions of input records (e.g., event logs or data records). Additionally, or alternatively, the data security system 110 may receive input records from one or more event information sources 193. For example, an event information source 193 may be a malware monitoring system locally installed on a computing asset or a third-party cloud-based malware monitoring system. As another example, an event information source 193 may be an access management system, for example implemented by a client of the data security system 110, which may monitor which user accounts access which computing assets. Although shown as a single event information source 193, the data security system 110 (e.g., event information manager 175) may receive event information from any quantity of event information sources 193. In some examples, event information sources 193 may be internal to the data security system 110 (e.g., the data security system 110 may generate input records when performing actions such as scanning for malware or blocking the download of a virus).

The event information manager 175 may store event records 155 based on input records received from the event information sources 193 in an event record database 150. Each event record 155 may indicate a user ID 160 (e.g., associated with a user account in the user account listing 140) and a computing asset ID 165 (e.g., associated with a computing asset ID in a computing asset listing 135, where each computing asset ID is associated with a computing asset 105 monitored by the data security system 110) associated with the event record 155. Event records 155 may also include data 170 associated with the event record (e.g., one or more files). For example, the event record 155-a may include a user ID 160-a, a computing asset ID 165-a, and data 170. As another example, the event record 155-n may include a user ID 160-n, a computing asset ID 165-n, and data 170-n.

As described herein, event records (e.g., log files) from different event information sources 193 may use different computing asset IDs to refer to the same computing asset 105 or may use different user IDs to refer to the same user account. For example, a computing asset ID in an input record may be a computing asset's hostname, a computing asset's fully qualified domain name, a MAC address, an IP address, or a serial number. As another example, a user ID may be a full name, a username, a variation of a full name (e.g., last name, first name), a first initial followed by a last name, or an email address. Accordingly, the event information manager 175 may identify a true computing asset ID associated with a computing asset 105 stored in a computing asset listing 135 based on the asset ID (e.g., an asset hostname, an asset fully qualified domain name, a MAC address, an IP address, or a serial number) in an input record. The event information manager 175 may store the event record 155 for the event associated with the input record using the computing asset ID 165 determined by the data security system 110. The event information manager 175 may identify a true user ID associated with a user account in a user account listing 140 based on the user ID (e.g., a full name, a first initial/last name, initials, email address, username, or name variation) indicated in the input record. The event information manager 175 may store the event record 155 for the event associated with the input record using the user ID 160 determined by the data security system 110.

As described herein, data 170 in different event records 155 may correspond to the same type or source of data. For example, data 170-a and data 170-n may each include sales information related to a same product that were stored on different computing assets 105. The data security system 110 may identify linkages between data 170 and may indicate in the event records 155 that data 170 is linked with data 170 in another event record.

Accordingly, the data security system 110 may provide a holistic view of event records 155. For example, each event record 155 may include a user ID 160 for a user account associated with the event record, where the user account may be a user account associated with a customer or client of the data security system 110 (e.g., tracked in a user account listing 140). Accordingly, for example, the data security system 110 may track which user accounts access which data and/or which computing assets 105 monitored by the data security system 110. For example, an alert manager 190 may trigger an alert (e.g., for display on the computing device 120 via the UI manager 145) if a user account accesses a computing device that user account is unauthorized to access. As another example, each event record 155 may include a computing asset ID 165 for a computing asset 105 monitored by the data security system 110, where the computing asset 105 may be a computing asset associated with a client of the data security system 110. (e.g., tracked in a computing asset listing 135). Accordingly, for example, the data security system 110 may track which computing assets 105 are used for different actions or are used by different users. As another example, the data security system 110 may identify if an unauthorized computing asset 105 is accessed (e.g., if a user account logs into an organization resource from an unauthorized computing asset). For example, an alert manager 190 may trigger an alert if an unauthorized computing asset appears in an event record. IT or security teams which receive the alert at the computing device 120 may accordingly notify the associated user of the breach or unauthorized access and/or correct the behavior. For example, with the context and linkages provided by the user IDs 160, computing asset IDs 165, and linkages between data 170, IT operations, security, cloud compliance, finance, and other disciplines within an organization may view more complete information regarding which user accounts use or access which computing assets 105 and/or where (e.g., on which computing assets 105) different types of data is stored and the linkages between the data.

As described herein, the data security system 110 may receive large amounts of event information in the form of security logs and/or IT logs (e.g., which may be stored as event records 155 as described herein). For example, SIEM systems for a client of the data security system 110 may generate large volumes of alerts, many of which may be false positives or may lack actionable insights. Further, security or IT teams of clients of the data security system may struggle to process the vast amount of alerts generated by SIEM systems and IT monitoring systems, especially given the varied and often non-readable format of log files and the lack of actional insights that may be present in log files. Accordingly, the data security system 110 may leverage one or more LLMs 191 to provide human-readable insights and/or recommendations for different types of events or alerts as reflected in event information obtained by the data security system.

For example, an administrative user for a particular client of the data security system 110 may provide a security policy 192 (e.g., via the computing device 120) to the data security system 110. Security policies for different clients of the data security system 110 may be stored and managed by the security policy manager 195. For example, the security policy may indicate security actions to perform for different types of events and for different users or computing assets 105. For example, some computing assets 105 may have a relatively higher importance for security or IT purposes than others. Thus, the security policy may indicate to provide security action recommendation for given types of events, computing assets 105, and/or user accounts (or roles to which user accounts may be assigned). For example, some computing assets 105 may store sensitive information (such as financial information, personal identifiable information, or trade secret information), and the security policy 192 may indicate to provide security recommendations for events affecting computing assets 105 that store or have access to sensitive information. As another example, some computing assets 105 may have a higher importance for business operations of a client of the data security system 110 than other computing assets 105, and thus the security policy 192 may indicate to provide security recommendations for events affecting computing assets 105 of given importance levels. For example, an email server may have a higher importance than a backup storage device for day to day business operations of a client of the data security system 110. As another example, computing assets 105 may have different levels of importance based on the types of users the computing assets 105 are assigned to (e.g., a computing assets 105 assigned to the chief executive officer of a client may be assigned a higher priority than a computing assets 105 assigned to a junior engineer or junior salesman role). Similarly, different roles within a client may be assigned different levels of importance in a security policy (e.g., vulnerabilities associated with the user account of the chief executive officer of a client may be assigned a higher priority than vulnerabilities associated with user accounts associated with a junior engineer or junior salesman role), and the security policy 192 may indicate to provide security recommendations for events affecting user accounts associated with given types of roles.

Similarly, the security policy may indicate for which types of events to provide security action recommendations. For example, security type events may be ranked based on exposure or risk level. As another example, security type events may be ranked based on how many computing assets and/or user accounts are affected. Similarly, IT type events may be ranked based on the effect on business operations of the client (e.g., power outage may be more disruptive than a temporary reduction in upload/download speed for a given asset). As another example, IT type events may be ranked based on how many computing assets and/or user accounts are affected by the IT type event. As another example, some types of events may be known to be false positives or have no actionable resolution, and accordingly the security policy 192 may indicate to ignore such events. Thus, the security policy 192 may provide guidelines for types of security actions to perform for types of security and/or IT events and for which types of computing assets and/or user accounts to perform such actions.

In some examples, where a client of the data security system 110 does not provide a security policy 192, the security policy manager 195 may generate or use a default security policy for that client. For example, the default security policy may be based on recommended actions for given types of events affecting given types of computing assets and/or customer accounts in security policies provided by other clients of the data security system 110.

To generate a prompt 196 for the LLM to generate a response 197 that includes a recommended security action for event information for a particular client of the data security system 110, the data security system 110 (e.g., the filtering manager 180) may perform filtering on the event information and associated computing asset/user information based on the security policy 192 for that particular client. For example, as described herein, the data security system 110 may obtain (e.g., the event information manager 175 may obtain and process) event information such as log files that record or indicate security or IT type events from the computing assets 105 monitored by the data security system 110 (e.g., the computing assets 105 themselves may generate log files which may be provided to the data security system 110). As another example, the data security system 110 may obtain (e.g., the event information manager 175 may obtain and process) event information from an event information source 193 such as a third party malware or virus monitoring system or a third party access monitoring system. As another example, the data security system 110 may itself generate event information (e.g., the data security system 110 may generate input records when performing actions such as scanning for malware or blocking the download of a virus). As another example, an administrative user of the client or the data security system 110 may provide event information via the computing device 120. For example, the administrative user may provide a request 198 that includes the event information (e.g., includes log files) and/or points to event records 155 in the event record database 150.

Based on the security policy 192 for the particular client, the filtering manager 180 may identify one or more events from the event information and may identify one or more computing assets 105 or user accounts of the client affected by the one or more events. For example, SIEM and IT type event information and associated computing asset and user account information may exceed the quantity of information that can be input to an LLM in a prompt. Thus, the filtering manager 180 may identify one or more events from the event information for which to obtain a security action recommendation from the LLM 191. The event information (e.g., log files) may indicate asset IDs and/or user IDs, which the data security system 110 (e.g., the filtering manager 180 or the event information manager 175) may correlate to computing assets or user accounts as stored in the computing asset listing 135 or the user account listing. The filtering manager 180 may identify security and/or IT events from the event information that affect computing assets 105 or user accounts of a threshold importance and/or events that are of a threshold importance (e.g., satisfy a threshold threat or vulnerability level, satisfy a threshold business importance level as defined in the security policy 192). The filtering manager 180 may identify computing assets 105 and/or user accounts from multiple computing assets and/or user accounts affected by a given security or IT event based on the security policy 192 (e.g., based on an importance of the computing asset(s) and/or user accounts).

The filtering manager 180 may extract event information to include in a prompt 196 from the event information. For example, event information may include log files which may include repetitive information and/or non-human readable information. The filtering manager 180 may extract relevant description (e.g., a natural language description or a human readable description) of an event for a given event information, which description may be included in a prompt 196 that is provided to the LLM 191. The filtering manager 180 may extract computing asset information for identified computing assets and/or user account information from the identified user accounts from the data store 130. For example, for a given computing asset 105 identified as being affected by the event, the filtering manager 180 may extract information such as user accounts associated with computing asset, an asset ID, a physical location of the computing asset, a type of computing asset (e.g., server, personal computing device, smartphone, virtual machine), a network location of the computing asset, and/or types of information stored on the computing asset. As another example, for a given user account identified as being affected by the event, the filtering manager 180 may extract information such as the user account ID, computing assets to which the user account has access, permissions associated with the user account (e.g., which resources the user account has read-only access to and which resources the user account has read-write access to), and/or a physical location associated with the user account.

The LLM manager 185 may generate the prompt 196 based on the filtered event information and computing asset/user information. For example, the prompt 196 may include a description of the event(s) in natural language and filtered information regarding computing assets and/or user accounts affected by the event(s) as described herein. The prompt 196 may also include information from the security policy 192 for the particular client, such as recommended security actions for given types of security events affecting given types of computing assets and/or user accounts.

The LLM manager 185 may provide the prompt 196 to the LLM 191. The LLM 191 may provide a response 197 to the prompt 196. The response 197 may be a natural language response (e.g., human-readable text) that may indicate a security action recommendation for the event(s) and computing asset(s) and/or user accounts indicated in the prompt 196. For example, the LLM 191 may analyze extracted security threats. The LLM 191 may be trained or fine-tuned for security threat or IT event analysis. The LLM 191 may be any LLM model such as OpenAI ChatGPT, Anthropic Claude, Meta Llama, or Google Gemini. In some examples, the data security system 110 (e.g., the UI manager 145 or the alert manager 190) may provide a message 199 to an administrative user of the client (e.g., via the computing device 120) that indicates the security action recommendation for the event(s) and computing asset(s) and/or user accounts based on the response 197. For example, the message 199 may be transmitted via email and/or an instant messaging service to the computing device 120. The administrative user of the client may implement the security action recommended in the message 199. In some examples, the data security system 110 (e.g., the data security system controller 125) may verify the security action recommendation based on computing asset information and/or user account information in the data store 130. For example, the data security system 110 may verify accuracy of computing asset and/or user account information included in the security action recommendation before sending the message 199 that includes the security action recommendation. In some examples, the data security system 110 may modify the security action recommendation in the message 199 as compared to security action recommendation in the response 197 to adjust for any inaccuracies in the computing asset information and/or user account information. In some examples, the data security system 110 may generate a new prompt for provision to the LLM 191 with updated/accurate computing asset and/or user account information based on verification of the response 197.

The security action recommendations in the response 197 may be generated by the LLM 191 using artificial intelligence (AI) driven contextual analysis, thus reducing investigative workloads for security or IT administrators of the client account. For example, the security action recommendation provided by the LLM 191 in the response 197 may include a real-time threat playbook or a security operations center (SOC) analyst augmentation. For example, a real-time threat playbook may include AI-suggested containment actions for a given security event (e.g., isolating affected computing assets 105, terminating malicious processes). As another example, as an SOC analyst augmentation, the response 197 may provide a rationale for the security action recommendations, thereby minimizing the human workload for understanding why a particular action is recommended for a particular event and computing asset(s)/user accounts. In some examples, the data security system 110 (e.g., the data security system controller 125) may initiate automated workflows based on the security action recommendation in the response 197. For example, the workflows may execute an action recommended by the response 197 without input from an administrative user (e.g., without reception of a command to perform the security action from the computing device 120). For example, automated workflows may be triggered via security orchestration, automation, and response (SOAR) techniques implemented via platforms such as Palo Alto Cortex XSOAR or Splunk Phantom. In some examples, the data security system 110 may verify accuracy of computing asset and/or user account information included in the security action recommendation and/or security insight based on computing asset information and/or user account information in the data store 130 before implementing such automated workflows. For example, the data security system 110 may refrain from implementing automated workflows based on a security action recommendation in the response 197 if computing asset information or user account information is inaccurate.

As described herein, the response 197 may provide explainable security insights that may be implemented by a security or IT staff or team of a client of the data security system 110. For example, the response 197 may provide human-readable summaries for detected threats through AI-driven security analysis by the LLM 191 (e.g., in accordance with the security policy 192 for a given client). For example, AI may convert complex detection results into natural language narrative with concise explanations. For example, one AI-generated security summary may be, "A security event detected in SIEM indicates potential exploitation of CVE-2024-34075 within an OpenSSH service running on multiple cloud assets. Asset intelligence confirms that affected hosts belong to the finance department and have SSH ports open to the public. The threat actor appears to have bypassed authentication controls, escalating privileges to root access via crafted authentication requests." Such security insights may be provided in the message 199 as described herein.

Figure 2:
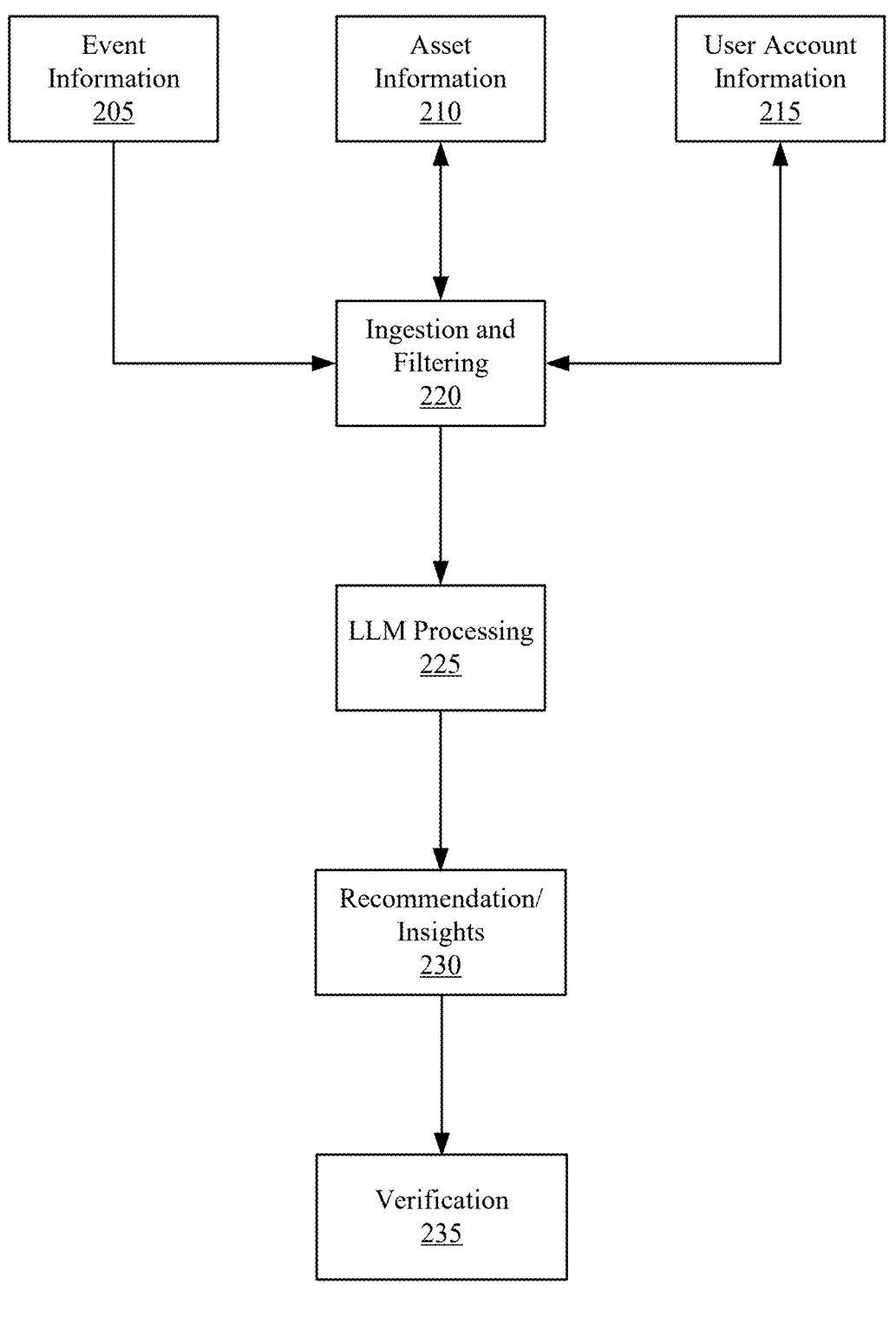
FIG. 2 shows an example of a flow diagram that supports LLM based security insights in accordance with aspects of the present disclosure.

FIG. 2 shows an example of a flow diagram 200 that supports LLM based security insights in accordance with aspects of the present disclosure. The flow diagram 200 may implement or may be implemented by aspects of the computing environment 100. For example, the flow diagram 200 may illustrate an example of a process that may be implemented by data security system 110 described with reference to FIG. 1. For example, the process illustrated by the flow diagram 200 may be implemented by the data security system 110 to obtain a natural language security action recommendation for one or more security or IT events.

As described herein, the data security system 110 may obtain event information 205 for monitored computing assets from one or more information sources. The event information 205 may indicate one or more security or IT type events. For example, the event information may be received from the computing assets themselves, from a third party (e.g., a malware monitoring system or an access monitoring system), or may be generated internally by the data security system. In some examples, the data security system 110 may receive event information 205 for a particular event in real-time (e.g., as an event occurs, a log file for the event may be generated and provided to the data security system 110) such as in a push manner. In some examples, the data security system 110 may poll or request monitored computing assets or third parties for event information (e.g., the data security system 110 may obtain event information 205 in a pull manner). In some examples, event information 205 may be received in a subscription manner. For example, monitored computing assets or third parties may periodically send event information to the data security system 110. In some examples, an administrative user of the data security system 110 or an administrative user of a client of the data security system 110 may provide event information 205 to the data security system 110 (e.g., after the events occurred) in a request for a security action recommendation for the event information.

Based on obtention of the event information, the data security system 110 may identify one or more affected computing assets and/or one or more affected user accounts associated with the event information 205, for example, based on identifiers associated with the computing assets and/or user accounts in the event information 205 that matches stored identifiers in the data store 130. Accordingly, the data security system 110 at may perform ingestion and filtering 220 of the event information 205 and associated computing asset information 210 and/or user account information 215. For example, the data security system 110 may retrieve relevant computing asset information 210 and/or user account information 215 from the data store 130 in accordance with a security policy for the particular client. The data security system 110 may also perform filtering on the ingested event information 205, computing asset information 210, and user account information 215 in accordance with the security policy to identify the relevant events, and computing asset information and/or user account information from the ingested event information 205, computing asset information 210, and user account information 215. For example, the filtering may identify events associated that satisfy threshold threat or vulnerability levels and/or that affect given types of computing assets (e.g., high priority computing assets) or user accounts (e.g., high priority user accounts). As another example, the filtering may ignore events known to be false positives or without an actionable response. The ingestion and filtering 220 of the event information 205 and associated computing asset information 210 and/or user account information 215 may also involve creation of a prompt for the LLM processing at 225. For example, the data security system 110 may extract a natural language description of the event(s) from log files in the event information and/or may include relevant computing asset information 210 (e.g., computing asset and/or user account identifiers, computing asset physical and/or network location, computing asset class, user account role, user account location).

The data security system 110 may provide the prompt to an LLM for LLM processing 225. The LLM processing 225 may provide a response to the prompt that includes a security action recommendation and/or insights at 230 in a natural language format (e.g., which is in a human readable format that can be implemented by an IT or data security administrator of the data security system 110 or a client of the data security system 110). For example, the LLM may be trained based on the security policy of the client of the data security system 110 as described herein to analyze and extract security and/or IT threats and provide a security action recommendation 230 for such security and/or IT threats for affected computing assets and/or accounts. As described herein, the security action recommendation at 230 may include a threat playbook (e.g., recommended action(s)) and may include a rationale for the threat playbook. In some examples, the data security system 110 may trigger automated workflows to execute the security action recommendation 230 from the LLM processing 225. In some examples, the natural language response provided by the LLM may provide data security insights at 230 based on the event(s) as described herein. For example, data security insights may explain in natural language the event that occurred and associated issues or threats.

In some examples, the data security system 110 may perform verification 235 of the security action recommendation or insight 230. For example, the data security system 110 may verify computing asset information and/or user account information in the security action recommendation or insight 230 against stored computing asset and/or user account information for the client in the data center prior to sending the security action recommendation or insight to the client or prior to triggering workflows to execute the security action recommendation.

In some examples, after performance of the security action recommendation 230, the data security system 110 may check if the issues that caused the associated events were resolved. For example, if the data security system 110 does not receive a same type of event notification for a particular event after the security action recommendation 230 for that particular event was performed, the data security system 110 may identify that the security action recommendation 230 was successful, and may update the security policy and/or may provide feedback to the LLM model that the security action recommendation 230 for that particular event was successful. In contrast, if the data security system 110 identifies that a security action recommendation 230 did not resolve a particular event (e.g., because the data security system 110 received a same type of event notification for a particular event after the security action recommendation 230 for that particular event was performed), the data security system 110 may update the security policy and/or may provide feedback to the LLM model to indicate that the security action recommendation 230 did not resolve the particular event.

Figure 3:
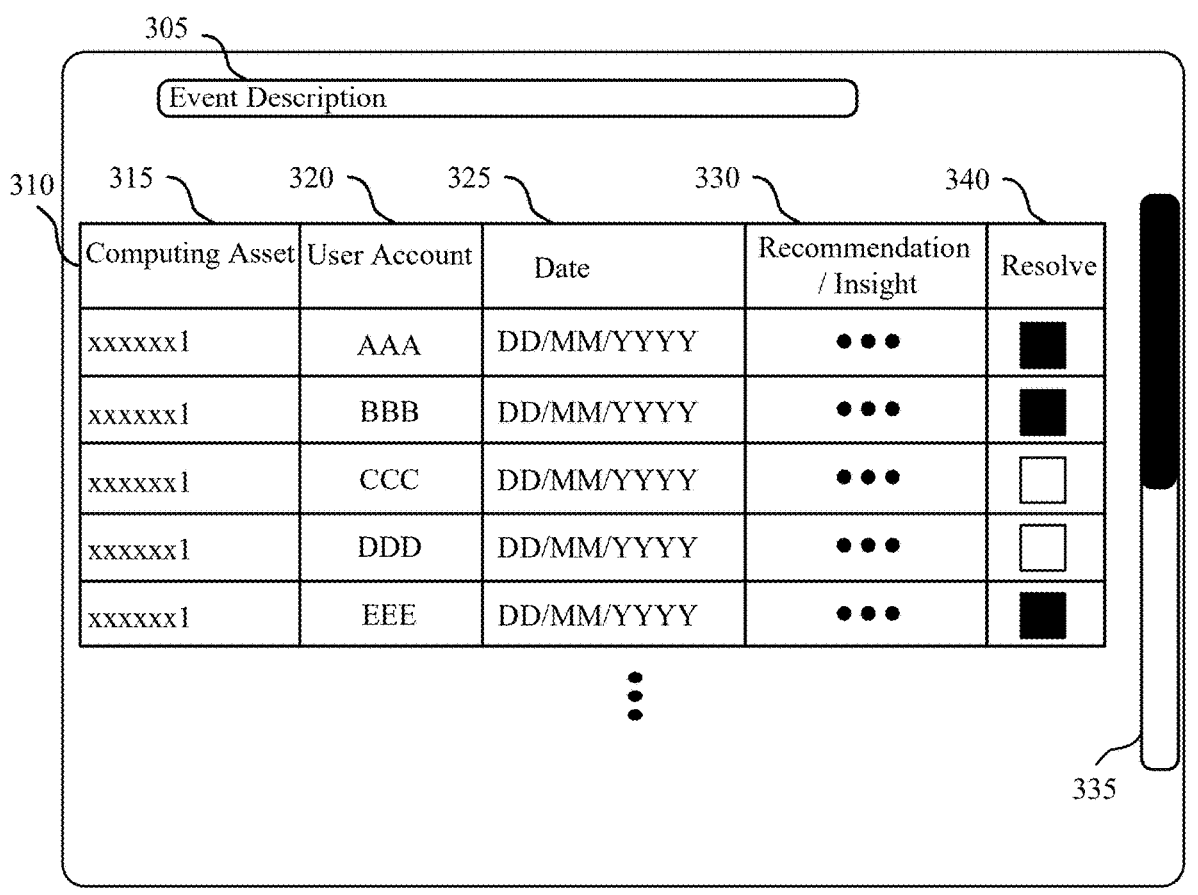
FIG. 3 shows an example of a user interface (UI) view that supports LLM based security insights in accordance with aspects of the present disclosure.

FIG. 3 shows an example of a UI view 300 that supports LLM based security insights in accordance with aspects of the present disclosure. The UI view 300 may implement or may be implemented by aspects of the computing environment 100 or the flow diagram 200. For example, the UI view 300 may be presented on a display of a computing device 120 as described herein. For example, the UI view 300 may illustrate an example of a UI on which an administrative user of a data security system 110 may view security action recommendations or insights for one or more security or IT events.

For example, the UI view 300 may include a natural language description 305 of a security or IT type event. For example, a natural language description 305 for a security event may be "security event detected in SIEM indicates potential exploitation of CVE-2024-34075 within an OpenSSH service running on multiple cloud assets." As another example, a natural language description for an IT may be "servers with memory usage above 90%."

The UI view 300 may include a field 310 which shows affected computing assets 315 and/or user accounts 320, the date and/or time 325 the event occurred, and a natural language security action recommendation or insight 330. In some examples, the UI view 300 may include a natural language security action recommendation or insight 330 for each affected computing asset 315 and/or user account 320. In some examples, the UI view 300 may include selectable fields 340 which the administrative user may select to trigger performance of the security action recommendation or insight 330 for each affected computing asset 315 and/or user account 320. The UI view 300 may include a scroll bar 335 to scroll through the computing assets 315 and/or user accounts 320 affected by the event.

As described herein, the information presented in the UI view 300 may be provided to an administrative user of the data security system 110 or a client of the data security system via a message (e.g., via email, instant messaging service, or an API through a web application or mobile application) after an LLM provides a response to a prompt for the event. The LLM may generate the information presented in the UI view 300 in response to a prompt created by the data security system 110.

Figure 4:
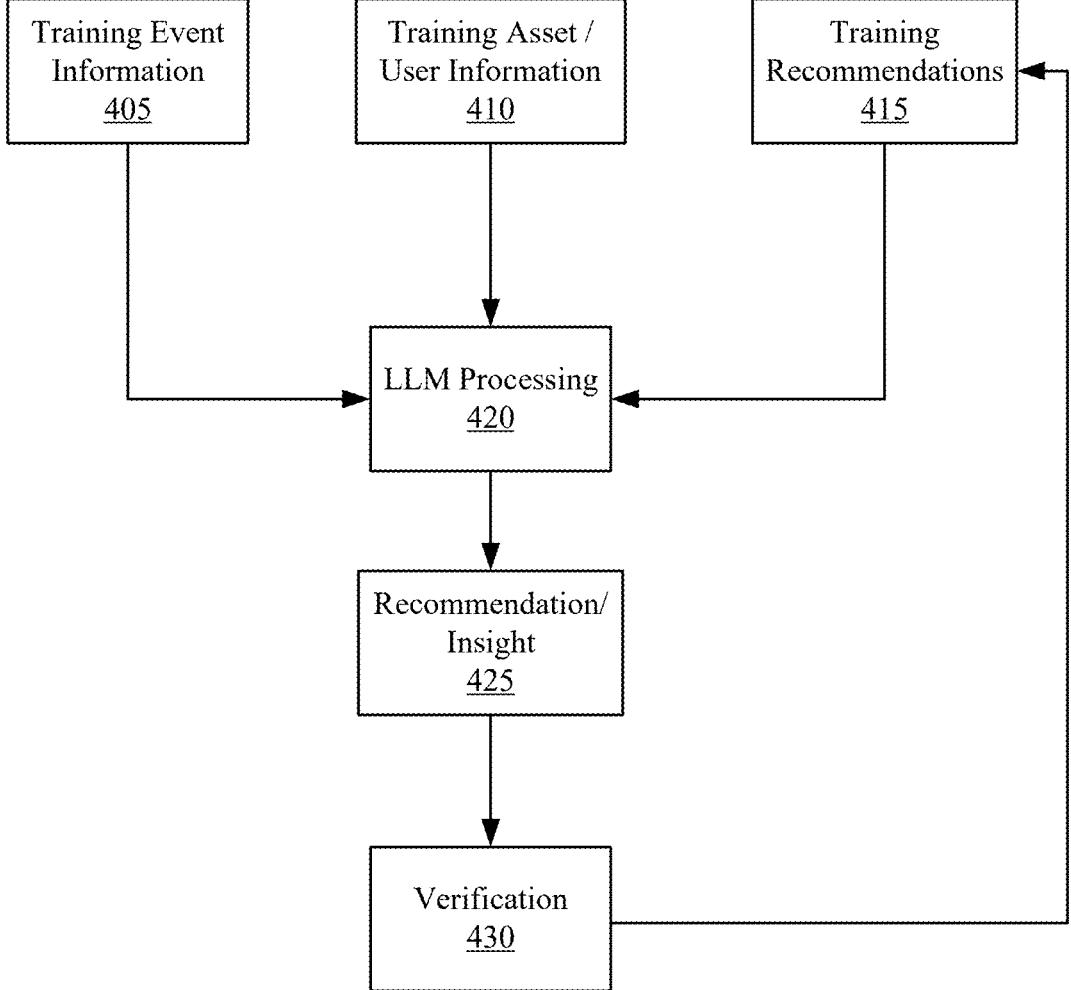
FIG. 4 shows an example of a flow diagram that supports LLM based security insights in accordance with aspects of the present disclosure.

FIG. 4 shows an example of a flow diagram 400 that supports LLM based security insights in accordance with aspects of the present disclosure. The flow diagram 400 may implement or may be implemented by aspects of the computing environment 100. For example, the flow diagram 400 may illustrate an example of a process that may be implemented by data security system 110 described with reference to FIG. 1. For example, the process illustrated by the flow diagram 200 may be implemented by the data security system 110 to train an LLM 191 to provide natural language security action recommendations or insights for one or more security or IT events.

For example, the data security system 110 may train the LLM by providing training event information 405, training computing asset and/or user account information 410, and training recommendations 415 for the training event information to the LLM for LLM processing 420. For example, the training recommendations may indicate which security actions will be performed for given types of events that affect given types of computing assets and/or user accounts.

The LLM may generate responses that include security action recommendations and/or insights 425 for given security and/or IT events in the training event information 405 for given computing assets and/or user accounts. The data security system 110 may perform verification 430 of whether each security action recommendation 425 would resolve a given training event for an associated computing asset and/or user account and/or whether the information in a security action insight is accurate. Based on the verification 430, the data security system 110 may update the training recommendations 415, and the data security system 110 may reperform the training to fine tune the LLM processing 420.

Figure 5:
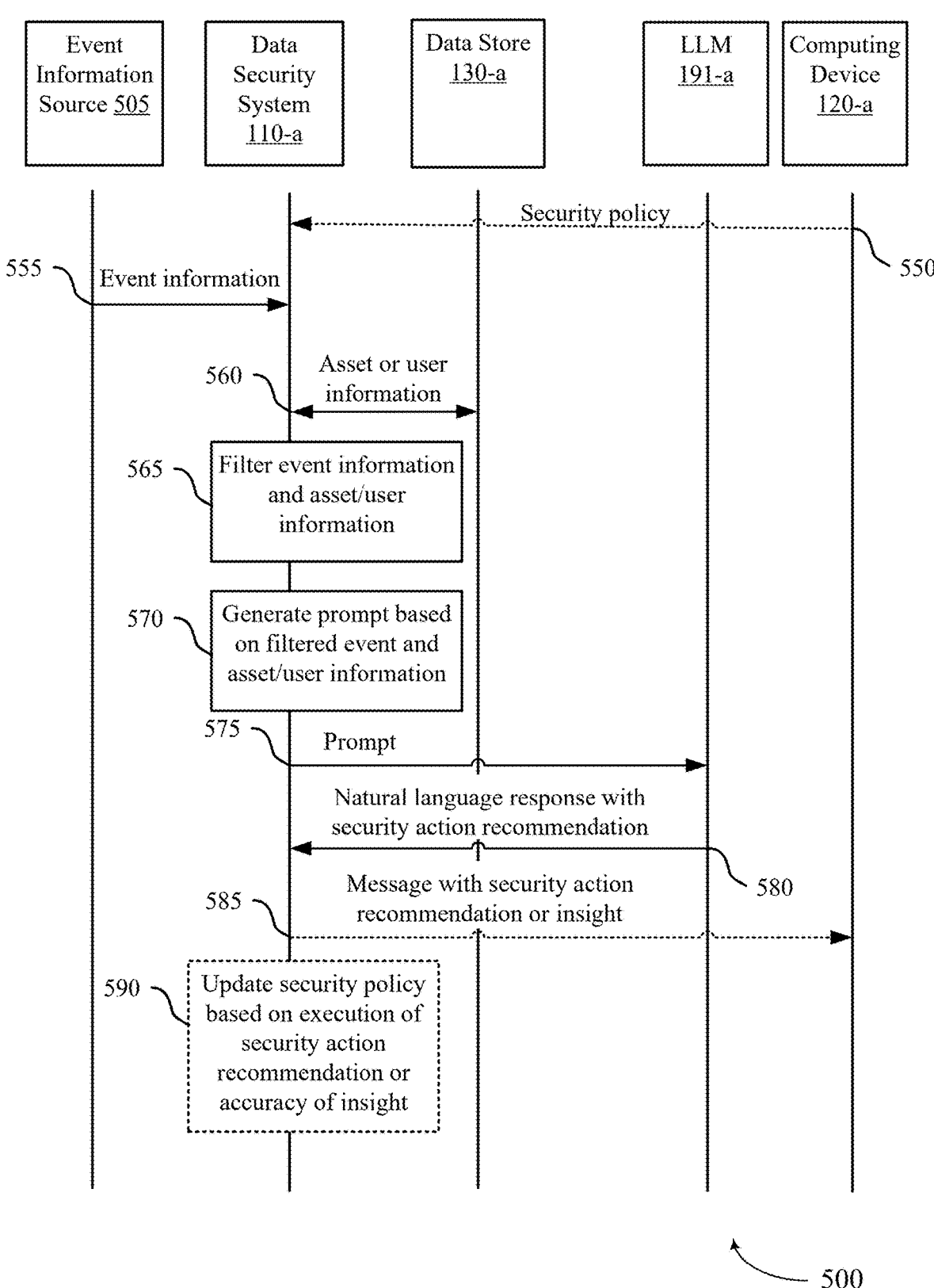
FIG. 5 shows an example of a process flow that supports LLM based security insights in accordance with aspects of the present disclosure.

FIG. 5 shows an example of a process flow 500 that supports LLM based security insights in accordance with aspects of the present disclosure. The process flow 500 may implement or may be implemented by one or more aspects of the computing environment 100, the flow diagram 200, the UI view 300, or the flow diagram 400. For example, the process flow 500 may include a data security system 110-*a*, which may be an example of a data security system 110 as described herein. The process flow 500 may include a data store 130-*a*, which may be an example of a data store 130 as described herein. The process flow 500 may include an LLM 191-*a*, which may be an example of an LLM as described herein. The process flow 500 may include a computing device 120-*a*, which may be an example of a computing device 120 as described herein. The process flow 500 may include an event information source 505, which may include one or more computing assets 105, an event information source 193, and/or an event information source internal to the data security system 110-*a*. In the following description of the process flow 500, operations between the event information source 505, the data security system 110-*a*, the data store 130-*a*, the LLM 191-*a*, and the computing device 120-*a* may be added, omitted, or performed in a different order (with respect to the exemplary order shown).

In some examples, at 550, the data security system 110-*a* may obtain a security policy for a particular client of the data security system 110-*a*. For example, an administrative user of the client may provide the data security policy via the computing device 120-*a*. In some examples, the data security system 110-*a* may generate a security policy for the particular client based on security policies of other clients of the data security system 110-*a*. For example, the security policy may indicate actions for different types of security and/or IT events that affect different types of computing assets and/or user accounts.

At 555, the data security system 110-*a* may obtain event information for a set of security or IT events associated with the client account of the data security system 110-*a*. In some examples, the event information may be received from a security information and event management system associated with the client account. In some examples, the event information may be received in real-time based on occurrence of the set of security or IT events. In some examples, the data security system may send a request to the security information and event management system for the event information, and the event information may be received in response to the request. In some examples, the event information may be pushed to the data security system periodically or in a subscription manner. In some examples, the event information may be received from a third party, such as a malware monitoring system or an access monitoring system (e.g., in a push manner, a request manner, or a subscription manner). In some examples, the event information may be received from monitored computing assets (e.g., in a push manner, a request manner, or a subscription manner). In some examples, the event information may be generated internally by the data security system 110-*a* for monitored computing assets and/or user accounts.

In some examples, the data security system 110-*a* may receive a request from the computing device 120-*a* associated with the client account to provide a security action recommendation or insight for the event information, and the request may include the event information.

At 560, the data security system 110-*a* may retrieve, from the data store 130-*a*, computing asset or user information associated with the client account based on the event information. For example, the data security system 110-*a* may identify one or more computing asset identifiers or one or more user identifiers in the event information, and retrieving the computing asset or user information may be on the computing asset or user information being associated with the one or more computing asset identifiers or the one or more user identifiers in the data store 130-*a*.

At 565, the data security system 110-*a* may filter the event information and the computing asset or user information in accordance with the security policy associated with the client account to generate filtered event and computing asset or user information.

In some examples, the event information may include a set of log files associated with the set of security or IT events. In some such examples, filtering the event information may involve extracting natural language text from the set of log files.

In some examples, filtering the event information may involve selecting a subset of security or IT events of the set of security or IT events based on the subset of security or IT events satisfying selection criteria associated with the security policy. For example, the subset of security or IT events may be security events, and the selection criteria may include a threat level threshold, one or more vulnerability classes associated with the security events, a computing asset class of one or more computing assets associated with the security events, a user class of one or more users associated with the security events, or any combination thereof. As another example, the subset of security or IT events may be IT events, and the selection criteria may include a computer processing unit usage threshold, a memory usage threshold, a latency threshold, a power threshold, a computing asset class of one or more computing assets associated with the IT events, a user class of one or more users associated with the IT events, or any combination thereof.

In some examples, filtering the computing asset or user information may involve selecting a subset of computing assets or a subset of users associated with the event information based on a computing asset class associated with the subset of computing assets, a type of information stored on the subset of computing assets, a physical location of the subset of computing assets, a vulnerability threshold associated with the subset of computing assets, a user class or role associated with the subset of users, an access level associated with the subset of users, or a physical location associated with the subset of users.

At 570, the data security system 110-*a* may generate, in accordance with the security policy, a prompt that includes the filtered event and computing asset or user information.

At 575, the data security system 110-*a* may provide the prompt to the LLM 191-*a*.

At 580 the data security system 110-*a* may receive, from the LLM 191-*a* and in response to the prompt, a natural language response that includes a security action recommendation or insight for one or more computing assets or users of the client account for one or more security or IT events of the set of security or IT events. In some examples, the natural language response includes a natural language rationale for one or more recommended actions of the security action recommendation.

In some examples, at 585, the data security system 110-*a* may send a message to the computing device 120-*a* with the natural language response that includes the security action recommendation or insight to a computing device associated with the client account. In some examples, the data security system 110-*a* may obtain, from the computing device 120-*a* or a second computing device associated with the client account, an indication of performance of the security action recommendation. In some such examples, the data security system 110-*a* may determine whether performance of the security action recommendation resolved a security or IT event of the set of security or IT events. In some such examples, at 590 the data security system 110-*a* may update the security policy based on determining whether performance of the security action recommendation resolved a security or IT event of the set of security or IT events. For example, the update may indicate whether the recommended security action resolved the particular event. In some examples, determining whether performance of the security action recommendation resolved a security or IT event may involve identifying, by the data security system 110-*a*, a presence or an absence of a same security or IT event in second event information obtained after obtention of the indication of performance of the security action recommendation. In some examples, at 590 the data security system 110-*a* may update the security policy based on determining whether the security insights were accurate. For example, the data security system 110-*a* may verify information in a security insight in the response at 580 against assent and/or user information stored in the data store 130-*a*.

In some examples, the security action recommendation may include: a recommendation to isolate a computing asset; a recommendation to terminate a process running on a computing asset; a recommendation to change an access level of one or more user accounts; a recommendation to update one or more permissions associated with one or more user accounts; a recommendation to update a role associated with one or more user accounts; a recommendation to replace a computing asset; a recommendation to add a computing asset; a recommendation to move information from one computing asset to another computing asset; a recommendation to perform an update on a computing asset; or any combination thereof.

In some examples, the data security system 110-*a* may execute one or more workflows to perform the security action recommendation.

In some examples, the data security system 110-*a* may provide, to the LLM 191-*a*, training data that includes respective recommended security actions for set of example security or IT events and associated computing asset or user information, and the security action recommendation or insight generated by the LLM may be based on provision of the training data to the LLM 191-*a*.

Figure 6:
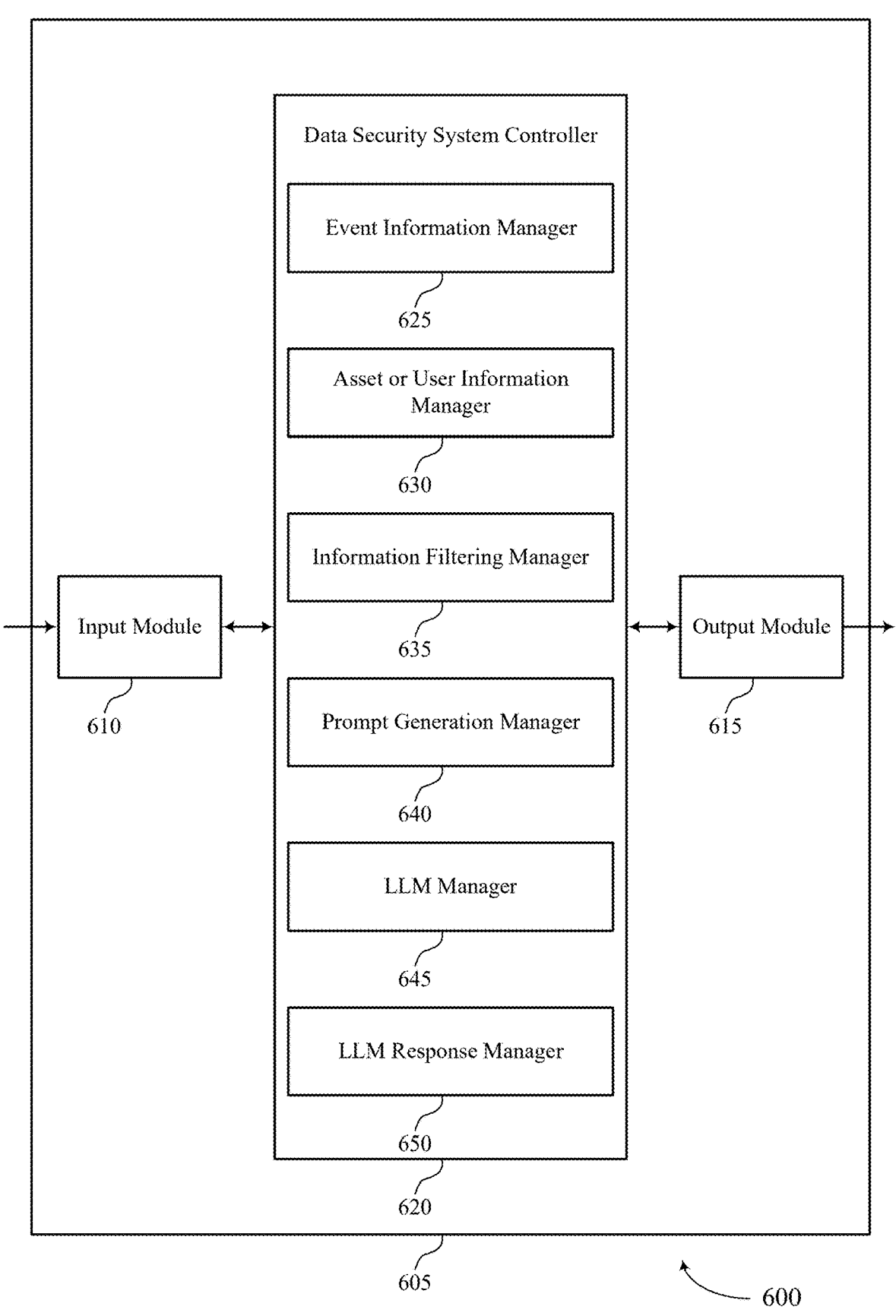
FIG. 6 shows a block diagram of an apparatus that supports LLM based security insights in accordance with aspects of the present disclosure.

FIG. 6 shows a block diagram 600 of a device 605 that supports LLM based security insights in accordance with aspects of the present disclosure. The device 605 may include an input module 610, an output module 615, and a data security system controller 620. The device 605, or one or more components of the device 605 (e.g., the input module 610, the output module 615, the data security system controller 620), may include at least one processor, which may be coupled with at least one memory, to support the described techniques. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the data security system controller 620 to support LLM based security insights. In some cases, the input module 610 may be a component of an input/output (I/O) controller 810 as described with reference to FIG. 8.

The output module 615 may manage output signals for the device 605. For example, the output module 615 may receive signals from other components of the device 605, such as the data security system controller 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the data security system controller 620 may include an event information manager 625, an asset or user information manager 630, an information filtering manager 635, a prompt generation manager 640, an LLM manager 645, an LLM response manager 650, or any combination thereof. In some examples, the data security system controller 620, or various components thereof, may be configured to perform various operations (e.g., receiving, monitoring, transmitting) using or otherwise in cooperation with the input module 610, the output module 615, or both. For example, the data security system controller 620 may receive information from the input module 610, send information to the output module 615, or be integrated in combination with the input module 610, the output module 615, or both to receive information, transmit information, or perform various other operations as described herein.

The event information manager 625 may be configured to support obtaining, at a data security system, event information for a set of security or IT events associated with a client account of the data security system. The asset or user information manager 630 may be configured to support retrieving, by the data security system and from a data store accessible to the data security system, asset or user information associated with the client account based on the event information. The information filtering manager 635 may be configured to support filtering, by the data security system, the event information and the asset or user information in accordance with a security policy associated with the client account to generate filtered event and asset or user information. The prompt generation manager 640 may be configured to support generating, by the data security system and in accordance with the security policy, a prompt that includes the filtered event and asset or user information. The LLM manager 645 may be configured to support providing the prompt to a LLM. The LLM response manager 650 may be configured to support receiving, from the LLM in response to the prompt, a natural language response that includes a security action recommendation or insight for one or more assets or users of the client account for one or more security or IT events of the set of security or IT events.

Figure 7:
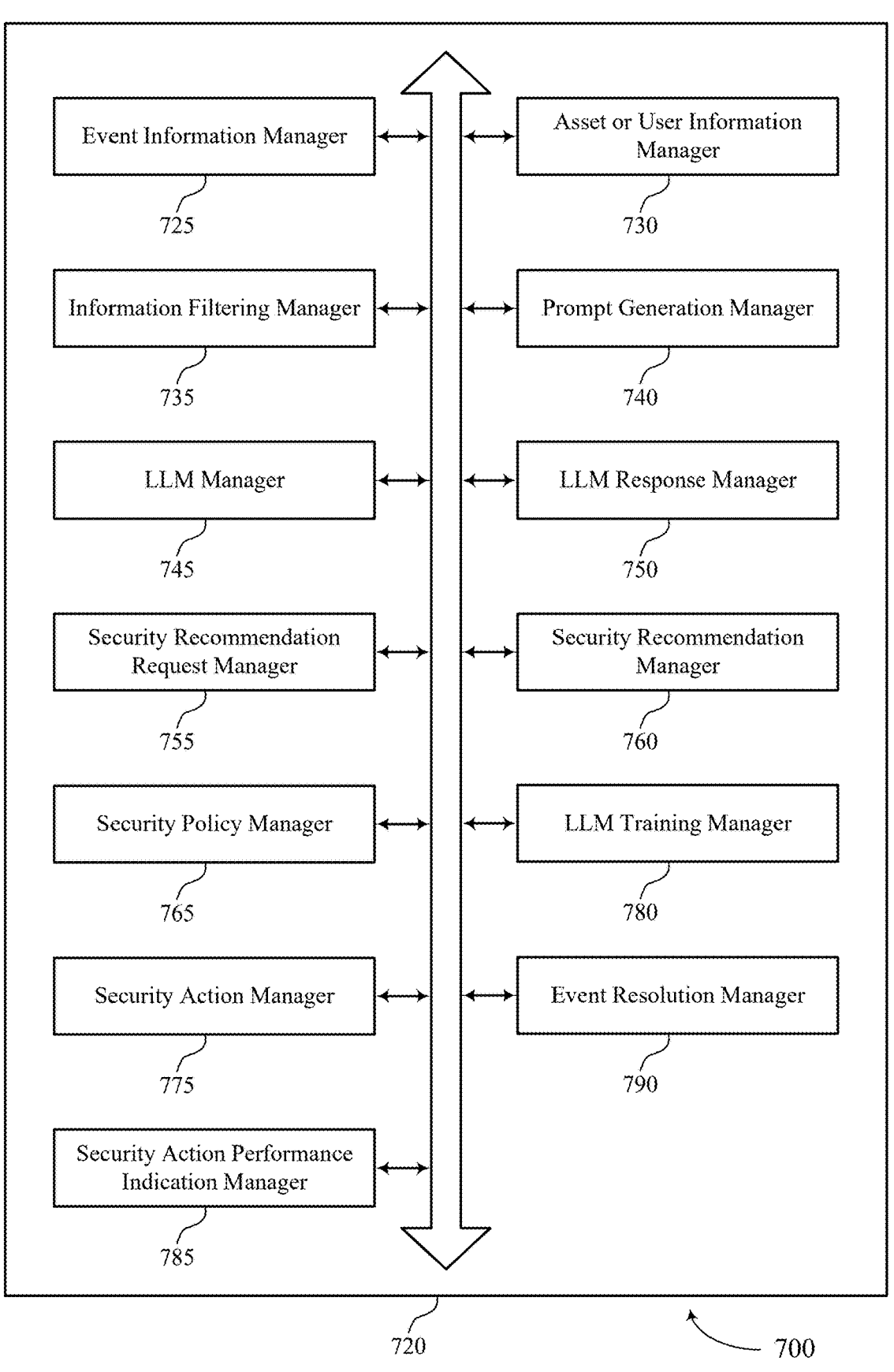
FIG. 7 shows a block diagram of a data security system controller that supports LLM based security insights in accordance with aspects of the present disclosure.

FIG. 7 shows a block diagram 700 of a data security system controller 720 that supports LLM based security insights in accordance with aspects of the present disclosure. The data security system controller 720 may be an example of aspects of a data security system controller or a data security system controller 620, or both, as described herein. The data security system controller 720, or various components thereof, may be an example of means for performing (e.g., to cause the data security system controller 720 to perform) various aspects of LLM based security insights as described herein. For example, the data security system controller 720 may include an event information manager 725, an asset or user information manager 730, an information filtering manager 735, a prompt generation manager 740, an LLM manager 745, an LLM response manager 750, a security recommendation request manager 755, a security recommendation manager 760, a security policy manager 765, a security action manager 775, an LLM training manager 780, a security action performance indication manager 785, an event resolution manager 790, or any combination thereof. Each of these components, or components of subcomponents thereof (e.g., one or more processors, one or more memories), may communicate, directly or indirectly, with one another (e.g., via one or more buses).

The event information manager 725 may be configured to support obtaining, at a data security system, event information for a set of security or IT events associated with a client account of the data security system. The asset or user information manager 730 may be configured to support retrieving, by the data security system and from a data store accessible to the data security system, asset or user information associated with the client account based on the event information. The information filtering manager 735 may be configured to support filtering, by the data security system, the event information and the asset or user information in accordance with a security policy associated with the client account to generate filtered event and asset or user information. The prompt generation manager 740 may be configured to support generating, by the data security system and in accordance with the security policy, a prompt that includes the filtered event and asset or user information. The LLM manager 745 may be configured to support providing the prompt to a LLM. The LLM response manager 750 may be configured to support receiving, from the LLM in response to the prompt, a natural language response that includes a security action recommendation or insight for one or more assets or users of the client account for one or more security or IT events of the set of security or IT events.

In some examples, the asset or user information manager 730 may be configured to support identifying, by the data security system, one or more asset identifiers or one or more user identifiers in the event information, where retrieving the asset or user information is based on the asset or user information being associated with the one or more asset identifiers or the one or more user identifiers in the data store.

In some examples, the event information includes a set of log files associated with the set of security or IT events.

In some examples, filtering the event information includes extracting natural language text from the set of log files.

In some examples, to support filtering the event information, the information filtering manager 735 may be configured to support selecting a subset of security or IT events of the set of security or IT events based on the subset of security or IT events satisfying selection criteria associated with the security policy.

In some examples, the subset of security or IT events are security events. In some examples, the selection criteria includes a threat level threshold, one or more vulnerability classes associated with the security events, an asset class of one or more assets associated with the security events, a user class of one or more users associated with the security events, or any combination thereof.

In some examples, the subset of security or IT events are IT events. In some examples, the selection criteria includes a computer processing unit usage threshold, a memory usage threshold, a latency threshold, a power threshold, an asset class of one or more assets associated with the IT events, a user class of one or more users associated with the IT events, or any combination thereof.

In some examples, to support filtering the asset or user information, the information filtering manager 735 may be configured to support selecting a subset of assets or a subset of users associated with the event information based on an asset class associated with the subset of assets, a type of information stored on the subset of assets, a physical location of the subset of assets, a vulnerability threshold associated with the subset of assets, a user class or role associated with the subset of users, an access level associated with the subset of users, or a physical location associated with the subset of users.

In some examples, to support obtaining the event information, the event information manager 725 may be configured to support receiving the event information from a security information and event management system associated with the client account.

In some examples, receiving the event information includes receiving the event information in real-time based on occurrence of the set of security or IT events.

In some examples, to support obtaining the event information, the security recommendation request manager 755 may be configured to support receiving a request from a computing device associated with the client account to provide the security action recommendation or insight for the event information, where the request includes the event information.

In some examples, the security recommendation manager 760 may be configured to support sending, by the data security system, the natural language response that includes the security action recommendation or insight to a computing device associated with the client account.

In some examples, the security action performance indication manager 785 may be configured to support obtaining, by the data security system and from the computing device or a second computing device associated with the client account, an indication of performance of the security action recommendation. In some examples, the event resolution manager 790 may be configured to support determining, by the data security system, whether performance of the security action recommendation resolved a security or IT event of the set of security or IT events. In some examples, the security policy manager 765 may be configured to support updating, by the data security system, the security policy based on the determining.

In some examples, to support determining, the event information manager 725 may be configured to support identifying, by the data security system, a presence or an absence of a same security or IT event in second event information obtained after obtention of the indication of performance of the security action recommendation.

In some examples, the security policy manager 765 may be configured to support obtaining, by the data security system and from one or more computing devices associated with the client account, the security policy.

In some examples, the security policy manager 765 may be configured to support generating, by the data security system, the security policy based on or more security policies obtained from one or more other client accounts of the data security system.

In some examples, the security action recommendation may include: a recommendation to isolate an asset; a recommendation to terminate a process running on an asset; a recommendation to change an access level of one or more user accounts; a recommendation to update one or more permissions associated with one or more user accounts; a recommendation to update a role associated with one or more user accounts; a recommendation to replace an asset; a recommendation to add an asset; a recommendation to move information from one asset to another asset; a recommendation to perform an update on an asset; or any combination thereof.

In some examples, the security action manager 775 may be configured to support executing, by the data security system, one or more workflows to perform the security action recommendation.

In some examples, the natural language response includes natural language rationale for one or more recommended actions of the security action recommendation.

In some examples, the LLM training manager 780 may be configured to support providing, to the LLM, training data including respective recommended security actions for set of example security or IT events and associated asset or user information, where the security action recommendation or insight is based on provision of the training data to the LLM.

Figure 8:
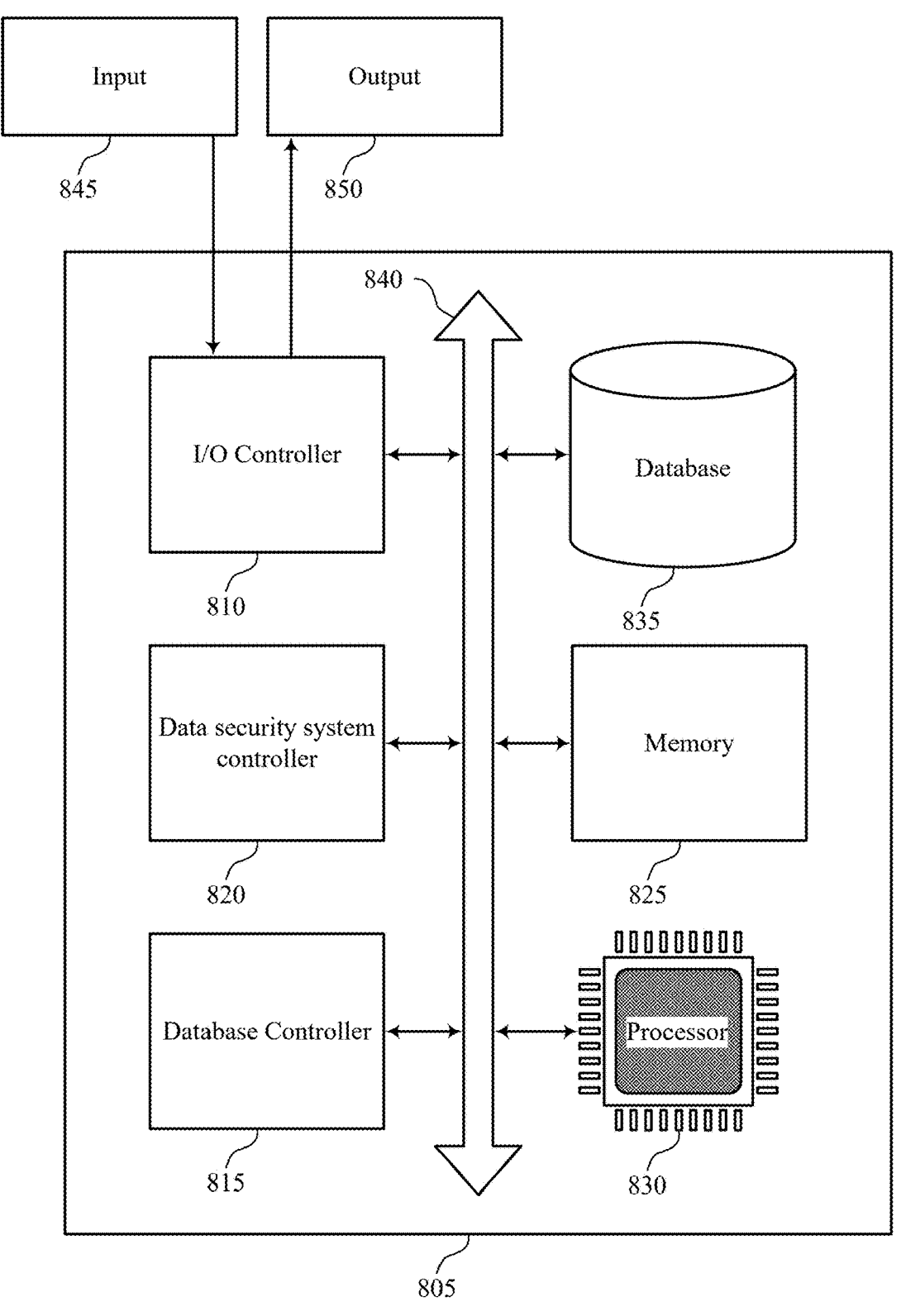
FIG. 8 shows a diagram of a system including a device that supports LLM based security insights in accordance with aspects of the present disclosure.

FIG. 8 shows a diagram of a system 800 including a device 805 that supports LLM based security insights in accordance with aspects of the present disclosure. The device 805 may be an example of or include components of a device 605 as described herein. The device 805 may include components for bi-directional data communications including components for transmitting and receiving communications, such as a data security system controller 820, an I/O controller, such as an I/O controller 810, a database controller 815, at least one memory 825, at least one processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause at least one processor 830 to perform various functions described herein. In some cases, the memory 825 may contain, among other things, a basic I/O system (BIOS) which may control basic hardware or software operation such as the interaction with peripheral components or devices. The memory 825 may be an example of a single memory or multiple memories. For example, the device 805 may include one or more memories 825.

The processor 830 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in at least one memory 825 to perform various functions (e.g., functions or tasks supporting LLM based security insights). The processor 830 may be an example of a single processor or multiple processors. For example, the device 805 may include one or more processors 830.

For example, the data security system controller 820 may be configured to support obtaining, at a data security system, event information for a set of security or IT events associated with a client account of the data security system. The data security system controller 820 may be configured to support retrieving, by the data security system and from a data storing accessible to the data security system, asset or user information associated with the client account based on the event information. The data security system controller 820 may be configured to support filtering, by the data security system, the event information and the asset or user information in accordance with a security policy associated with the client account to generate filtered event and asset or user information. The data security system controller 820 may be configured to support generating, by the data security system and in accordance with the security policy, a prompt that includes the filtered event and asset or user information. The data security system controller 820 may be configured to support providing the prompt to a LLM. The data security system controller 820 may be configured to support receiving, from the LLM in response to the prompt, a natural language response that includes a security action recommendation or insight for one or more assets or users of the client account for one or more security or IT events of the set of security or IT events.

By including or configuring the data security system controller 820 in accordance with examples as described herein, the device 805 may support techniques for human readable security insights and recommendations for security and/or IT events.

FIG. 9 shows a flowchart illustrating a method 900 that supports LLM based security insights in accordance with aspects of the present disclosure. The operations of the method 900 may be implemented by a data security system or its components as described herein. For example, the operations of the method 900 may be performed by a data security system as described with reference to FIGS. 1 through 8. In some examples, a data security system may execute a set of instructions to control the functional elements of the data security system to perform the described functions. Additionally, or alternatively, the data security system may perform aspects of the described functions using special-purpose hardware.

At 905, the method may include obtaining, at a data security system, event information for a set of security or IT events associated with a client account of the data security system. The operations of 905 may be performed in accordance with examples as disclosed herein. In some examples, aspects of the operations of 905 may be performed by an event information manager 725.

At 910, the method may include retrieving, by the data security system and from a data store accessible to the data security system, asset or user information associated with the client account based on the event information. The operations of 910 may be performed in accordance with examples as disclosed herein. In some examples, aspects of the operations of 910 may be performed by an asset or user information manager 730.

At 915, the method may include filtering, by the data security system, the event information and the asset or user information in accordance with a security policy associated with the client account to generate filtered event and asset or user information. The operations of 915 may be performed in accordance with examples as disclosed herein. In some examples, aspects of the operations of 915 may be performed by an information filtering manager 735.

At 920, the method may include generating, by the data security system and in accordance with the security policy, a prompt that includes the filtered event and asset or user information. The operations of 920 may be performed in accordance with examples as disclosed herein. In some examples, aspects of the operations of 920 may be performed by a prompt generation manager 740.

At 925, the method may include providing the prompt to a LLM. The operations of 925 may be performed in accordance with examples as disclosed herein. In some examples, aspects of the operations of 925 may be performed by an LLM manager 745.

At 930, the method may include receiving, from the LLM in response to the prompt, a natural language response that includes a security action recommendation or insight for one or more assets or users of the client account for one or more security or IT events of the set of security or IT events. The operations of 930 may be performed in accordance with examples as disclosed herein. In some examples, aspects of the operations of 930 may be performed by an LLM response manager 750.

FIG. 10 shows a flowchart illustrating a method 1000 that supports LLM based security insights in accordance with aspects of the present disclosure. The operations of the method 1000 may be implemented by a data security system or its components as described herein. For example, the operations of the method 1000 may be performed by a data security system as described with reference to FIGS. 1 through 8. In some examples, a data security system may execute a set of instructions to control the functional elements of the data security system to perform the described functions. Additionally, or alternatively, the data security system may perform aspects of the described functions using special-purpose hardware.

At 1005, the method may include obtaining, at a data security system, event information for a set of security or IT events associated with a client account of the data security system. The operations of 1005 may be performed in accordance with examples as disclosed herein. In some examples, aspects of the operations of 1005 may be performed by an event information manager 725.

At 1010, the method may include retrieving, by the data security system and from a data store accessible to the data security system, asset or user information associated with the client account based on the event information. The operations of 1010 may be performed in accordance with examples as disclosed herein. In some examples, aspects of the operations of 1010 may be performed by an asset or user information manager 730.

At 1015, the method may include filtering, by the data security system, the event information and the asset or user information in accordance with a security policy associated with the client account to generate filtered event and asset or user information. The operations of 1015 may be performed in accordance with examples as disclosed herein. In some examples, aspects of the operations of 1015 may be performed by an information filtering manager 735.

At 1020, the method may include generating, by the data security system and in accordance with the security policy, a prompt that includes the filtered event and asset or user information. The operations of 1020 may be performed in accordance with examples as disclosed herein. In some examples, aspects of the operations of 1020 may be performed by a prompt generation manager 740.

At 1025, the method may include providing the prompt to a LLM. The operations of 1025 may be performed in accordance with examples as disclosed herein. In some examples, aspects of the operations of 1025 may be performed by an LLM manager 745.

At 1030, the method may include receiving, from the LLM in response to the prompt, a natural language response that includes a security action recommendation or insight for one or more assets or users of the client account for one or more security or IT events of the set of security or IT events. The operations of 1030 may be performed in accordance with examples as disclosed herein. In some examples, aspects of the operations of 1030 may be performed by an LLM response manager 750.

At 1035, the method may include identifying, by the data security system, one or more asset identifiers or one or more user identifiers in the event information, where retrieving the asset or user information is based on the asset or user information being associated with the one or more asset identifiers or the one or more user identifiers in the data store. The operations of 1035 may be performed in accordance with examples as disclosed herein. In some examples, aspects of the operations of 1035 may be performed by an asset or user information manager 730.

A method by an apparatus is described. The method may include obtaining, at a data security system, event information for a set of security or IT events associated with a client account of the data security system, retrieving, by the data security system and from a data store accessible to the data security system, asset or user information associated with the client account based on the event information, filtering, by the data security system, the event information and the asset or user information in accordance with a security policy associated with the client account to generate filtered event and asset or user information, generating, by the data security system and in accordance with the security policy, a prompt that includes the filtered event and asset or user information, providing the prompt to a LLM, and receiving, from the LLM in response to the prompt, a natural language response that includes a security action recommendation or insight for one or more assets or users of the client account for one or more security or IT events of the set of security or IT events.

An apparatus is described. The apparatus may include one or more memories storing processor executable code, and one or more processors coupled with the one or more memories. The one or more processors may individually or collectively be operable to execute the code to cause the apparatus to obtain, at a data security system, event information for a set of security or IT events associated with a client account of the data security system, retrieving, by the data security system and from a data store accessible to the data security system, asset or user information associated with the client account based on the event information, filter, by the data security system, the event information and the asset or user information in accordance with a security policy associated with the client account to generate filtered event and asset or user information, generate, by the data security system and in accordance with the security policy, a prompt that includes the filtered event and asset or user information, provide the prompt to a LLM, and receive, from the LLM in response to the prompt, a natural language response that includes a security action recommendation or insight for one or more assets or users of the client account for one or more security or IT events of the set of security or IT events.

Another apparatus is described. The apparatus may include means for obtaining, at a data security system, event information for a set of security or IT events associated with a client account of the data security system, means for retrieving, by the data security system and from a data store accessible to the data security system, asset or user information associated with the client account based on the event information, means for filtering, by the data security system, the event information and the asset or user information in accordance with a security policy associated with the client account to generate filtered event and asset or user information, means for generating, by the data security system and in accordance with the security policy, a prompt that includes the filtered event and asset or user information, means for providing the prompt to a LLM, and means for receiving, from the LLM in response to the prompt, a natural language response that includes a security action recommendation or insight for one or more assets or users of the client account for one or more security or IT events of the set of security or IT events.

A non-transitory computer-readable medium storing code is described. The code may include instructions executable by one or more processors to obtain, at a data security system, event information for a set of security or IT events associated with a client account of the data security system, retrieving, by the data security system and from a data store accessible to the data security system, asset or user information associated with the client account based on the event information, filter, by the data security system, the event information and the asset or user information in accordance with a security policy associated with the client account to generate filtered event and asset or user information, generate, by the data security system and in accordance with the security policy, a prompt that includes the filtered event and asset or user information, provide the prompt to a LLM, and receive, from the LLM in response to the prompt, a natural language response that includes a security action recommendation or insight for one or more assets or users of the client account for one or more security or IT events of the set of security or IT events.

Some examples of the method, apparatus, and non-transitory computer-readable medium described herein may further include operations, features, means, or instructions for identifying, by the data security system, one or more asset identifiers or one or more user identifiers in the event information, where retrieving the asset or user information may be based on the asset or user information being associated with the one or more asset identifiers or the one or more user identifiers in the data store.

In some examples of the method, apparatus, and non-transitory computer-readable medium described herein, the event information includes a set of log files associated with the set of security or IT events.

Some examples of the method, apparatus, and non-transitory computer-readable medium described herein may further include operations, features, means, or instructions for filtering the event information includes extracting natural language text from the set of log files.

In some examples of the method, apparatus, and non-transitory computer-readable medium described herein, filtering the event information may include operations, features, means, or instructions for selecting a subset of security or IT events of the set of security or IT events based on the subset of security or IT events satisfying selection criteria associated with the security policy.

In some examples of the method, apparatus, and non-transitory computer-readable medium described herein, the subset of security or IT events may be security events and the selection criteria includes a threat level threshold, one or more vulnerability classes associated with the security events, an asset class of one or more assets associated with the security events, a user class of one or more users associated with the security events, or any combination thereof.

In some examples of the method, apparatus, and non-transitory computer-readable medium described herein, the subset of security or IT events may be IT events and the selection criteria includes a computer processing unit usage threshold, a memory usage threshold, a latency threshold, a power threshold, an asset class of one or more assets associated with the IT events, a user class of one or more users associated with the IT events, or any combination thereof.

In some examples of the method, apparatus, and non-transitory computer-readable medium described herein, filtering the asset or user information may include operations, features, means, or instructions for selecting a subset of assets or a subset of users associated with the event information based on an asset class associated with the subset of assets, a type of information stored on the subset of assets, a physical location of the subset of assets, a vulnerability threshold associated with the subset of assets, a user class or role associated with the subset of users, an access level associated with the subset of users, or a physical location associated with the subset of users.

In some examples of the method, apparatus, and non-transitory computer-readable medium described herein, obtaining the event information may include operations, features, means, or instructions for receiving the event information from a security information and event management system associated with the client account.

Some examples of the method, apparatus, and non-transitory computer-readable medium described herein may further include operations, features, means, or instructions for receiving the event information includes receiving the event information in real-time based on occurrence of the set of security or IT events.

In some examples of the method, apparatus, and non-transitory computer-readable medium described herein, obtaining the event information may include operations, features, means, or instructions for receiving a request from a computing device associated with the client account to provide the security action recommendation or insight for the event information, where the request includes the event information.

Some examples of the method, apparatus, and non-transitory computer-readable medium described herein may further include operations, features, means, or instructions for sending, by the data security system, the natural language response that includes the security action recommendation or insight to a computing device associated with the client account.

Some examples of the method, apparatus, and non-transitory computer-readable medium described herein may further include operations, features, means, or instructions for obtaining, by the data security system and from the computing device or a second computing device associated with the client account, an indication of performance of the security action recommendation, determining, by the data security system, whether performance of the security action recommendation resolved a security or IT event of the set of security or IT events, and updating, by the data security system, the security policy based on the determining.

In some examples of the method, apparatus, and non-transitory computer-readable medium described herein, the determining may include operations, features, means, or instructions for identifying, by the data security system, a presence or an absence of a same security or IT event in second event information obtained after obtention of the indication of performance of the security action recommendation.

Some examples of the method, apparatus, and non-transitory computer-readable medium described herein may further include operations, features, means, or instructions for obtaining, by the data security system and from one or more computing devices associated with the client account, the security policy.

Some examples of the method, apparatus, and non-transitory computer-readable medium described herein may further include operations, features, means, or instructions for generating, by the data security system, the security policy based on or more security policies obtained from one or more other client accounts of the data security system.

In some examples of the method, apparatus, and non-transitory computer-readable medium described herein, the security action recommendation may include operations, features, means, or instructions for a recommendation to isolate an asset, a recommendation to terminate a process running on an asset, a recommendation to change an access level of one or more user accounts, a recommendation to update one or more permissions associated with one or more user accounts, a recommendation to update a role associated with one or more user accounts, a recommendation to replace an asset, a recommendation to add an asset, a recommendation to move information from one asset to another asset, a recommendation to perform an update on an asset, and any combination thereof.

Some examples of the method, apparatus, and non-transitory computer-readable medium described herein may further include operations, features, means, or instructions for executing, by the data security system, one or more workflows to perform the security action recommendation.

In some examples of the method, apparatus, and non-transitory computer-readable medium described herein, the natural language response includes natural language rationale for one or more recommended actions of the security action recommendation.

Some examples of the method, apparatus, and non-transitory computer-readable medium described herein may further include operations, features, means, or instructions for providing, to the LLM, training data including respective recommended security actions for set of example security or IT events and associated asset or user information, where the security action recommendation or insight may be based on provision of the training data to the LLM.

The following provides an overview of aspects of the present disclosure:

Aspect 1: A method, comprising: obtaining, at a data security system, event information for a set of security or IT events associated with a client account of the data security system; retrieving, by the data security system and from a data store accessible to the data security system, asset or user information associated with the client account based at least in part on the event information; filtering, by the data security system, the event information and the asset or user information in accordance with a security policy associated with the client account to generate filtered event and asset or user information; generating, by the data security system and in accordance with the security policy, a prompt that includes the filtered event and asset or user information; providing the prompt to a LLM; and receiving, from the LLM in response to the prompt, a natural language response that includes a security action recommendation or insight for one or more assets or users of the client account for one or more security or IT events of the set of security or IT events.

Aspect 2: The method of aspect 1, further comprising: identifying, by the data security system, one or more asset identifiers or one or more user identifiers in the event information, wherein retrieving the asset or user information is based at least in part on the asset or user information being associated with the one or more asset identifiers or the one or more user identifiers in the data store.

Aspect 3: The method of any of aspects 1 through 2, wherein the event information comprises a set of log files associated with the set of security or IT events.

Aspect 4: The method of aspect 3, wherein filtering the event information comprises extracting natural language text from the set of log files.

Aspect 5: The method of any of aspects 1 through 4, wherein filtering the event information comprises: selecting a subset of security or IT events of the set of security or IT events based at least in part on the subset of security or IT events satisfying selection criteria associated with the security policy.

Aspect 6: The method of aspect 5, wherein the subset of security or IT events are security events, and the selection criteria comprises a threat level threshold, one or more vulnerability classes associated with the security events, an asset class of one or more assets associated with the security events, a user class of one or more users associated with the security events, or any combination thereof.

Aspect 7: The method of any of aspects 5 through 6, wherein the subset of security or IT events are IT events, and the selection criteria comprises a computer processing unit usage threshold, a memory usage threshold, a latency threshold, a power threshold, an asset class of one or more assets associated with the IT events, a user class of one or more users associated with the IT events, or any combination thereof.

Aspect 8: The method of any of aspects 1 through 7, wherein filtering the asset or user information comprises: selecting a subset of assets or a subset of users associated with the event information based at least in part on an asset class associated with the subset of assets, a type of information stored on the subset of assets, a physical location of the subset of assets, a vulnerability threshold associated with the subset of assets, a user class or role associated with the subset of users, an access level associated with the subset of users, or a physical location associated with the subset of users.

Aspect 9: The method of any of aspects 1 through 8, wherein obtaining the event information comprises: receiving the event information from a security information and event management system associated with the client account.

Aspect 10: The method of aspect 9, wherein receiving the event information comprises receiving the event information in real-time based on occurrence of the set of security or IT events.

Aspect 11: The method of any of aspects 1 through 8, wherein obtaining the event information comprises: receiving a request from a computing device associated with the client account to provide the security action recommendation or insight for the event information, wherein the request comprises the event information.

Aspect 12: The method of any of aspects 1 through 11, further comprising: sending, by the data security system, the natural language response that includes the security action recommendation or insight to a computing device associated with the client account.

Aspect 13: The method of aspect 12, further comprising: obtaining, by the data security system and from the computing device or a second computing device associated with the client account, an indication of performance of the security action recommendation; determining, by the data security system, whether performance of the security action recommendation resolved a security or IT event of the set of security or IT events; and updating, by the data security system, the security policy based at least in part on the determining.

Aspect 14: The method of aspect 13, wherein the determining comprises: identifying, by the data security system, a presence or an absence of a same security or IT event in second event information obtained after obtention of the indication of performance of the security action recommendation.

Aspect 15: The method of any of aspects 1 through 14, further comprising: obtaining, by the data security system and from one or more computing devices associated with the client account, the security policy.

Aspect 16: The method of any of aspects 1 through 14, further comprising: generating, by the data security system, the security policy based at least in part on or more security policies obtained from one or more other client accounts of the data security system.

Aspect 17: The method of any of aspects 1 through 16, wherein the security action recommendation comprises: a recommendation to isolate an asset; a recommendation to terminate a process running on an asset; a recommendation to change an access level of one or more user accounts; a recommendation to update one or more permissions associated with one or more user accounts; a recommendation to update a role associated with one or more user accounts; a recommendation to replace an asset; a recommendation to add an asset; a recommendation to move information from one asset to another asset; a recommendation to perform an update on an asset; or any combination thereof.

Aspect 18: The method of any of aspects 1 through 17, further comprising: executing, by the data security system, one or more workflows to perform the security action recommendation.

Aspect 19: The method of any of aspects 1 through 18, wherein the natural language response comprises natural language rationale for one or more recommended actions of the security action recommendation.

Aspect 20: The method of any of aspects 1 through 19, further comprising: providing, to the LLM, training data comprising respective recommended security actions for set of example security or IT events and associated asset or user information, wherein the security action recommendation or insight is based at least in part on provision of the training data to the LLM.

Aspect 21: An apparatus comprising one or more memories storing processor-executable code, and one or more processors coupled with the one or more memories and individually or collectively operable to execute the code to cause the apparatus to perform a method of any of aspects 1 through 20.

Aspect 22: An apparatus comprising at least one means for performing a method of any of aspects 1 through 20.

Aspect 23: A non-transitory computer-readable medium storing code the code comprising instructions executable by one or more processors to perform a method of any of aspects 1 through 20.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    obtaining, at a data security system, event information for a set of security or information technology events associated with a client account of the data security system;
    retrieving, by the data security system and from a data store accessible to the data security system, asset or user information associated with the client account based at least in part on the event information;
    filtering, by the data security system, the event information and the asset or user information in accordance with a security policy associated with the client account to generate filtered event and asset or user information;
    generating, by the data security system and in accordance with the security policy, a prompt that includes the filtered event and asset or user information;
    providing the prompt to a large language model; and
    receiving, from the large language model in response to the prompt, a natural language response that includes a security action recommendation or insight for one or more assets or users of the client account for one or more security or information technology events of the set of security or information technology events.

2. The method of claim 1, further comprising:
    identifying, by the data security system, one or more asset identifiers or one or more user identifiers in the event information, wherein retrieving the asset or user information is based at least in part on the asset or user information being associated with the one or more asset identifiers or the one or more user identifiers in the data store.

3. The method of claim 1, wherein the event information comprises a set of log files associated with the set of security or information technology events.

4. The method of claim 3, wherein filtering the event information comprises extracting natural language text from the set of log files.

5. The method of claim 1, wherein filtering the event information comprises:

selecting a subset of security or information technology events of the set of security or information technology events based at least in part on the subset of security or information technology events satisfying selection criteria associated with the security policy.

6. The method of claim 5, wherein:

the subset of security or information technology events are security events, and the selection criteria comprises a threat level threshold, one or more vulnerability classes associated with the security events, an asset class of one or more assets associated with the security events, a user class of one or more users associated with the security events, or any combination thereof.

7. The method of claim 5, wherein:

the subset of security or information technology events are information technology events, and the selection criteria comprises a computer processing unit usage threshold, a memory usage threshold, a latency threshold, a power threshold, an asset class of one or more assets associated with the information technology events, a user class of one or more users associated with the information technology events, or any combination thereof.

8. The method of claim 1, wherein filtering the asset or user information comprises:

selecting a subset of assets or a subset of users associated with the event information based at least in part on an asset class associated with the subset of assets, a type of information stored on the subset of assets, a physical location of the subset of assets, a vulnerability threshold associated with the subset of assets, a user class or role associated with the subset of users, an access level associated with the subset of users, or a physical location associated with the subset of users.

9. The method of claim 1, wherein obtaining the event information comprises:

receiving the event information from a security information and event management system associated with the client account.

10. The method of claim 9, wherein receiving the event information comprises receiving the event information in real-time based on occurrence of the set of security or information technology events.

11. The method of claim 1, wherein obtaining the event information comprises:

receiving a request from a computing device associated with the client account to provide the security action recommendation or insight for the event information, wherein the request comprises the event information.

12. The method of claim 1, further comprising:

sending, by the data security system, the natural language response that includes the security action recommendation or insight to a computing device associated with the client account.

13. The method of claim 12, further comprising:

obtaining, by the data security system and from the computing device or a second computing device associated with the client account, an indication of performance of the security action recommendation;

determining, by the data security system, whether performance of the security action recommendation resolved a security or information technology event of the set of security or information technology events; and updating, by the data security system, the security policy based at least in part on the determining.

14. The method of claim 13, wherein the determining comprises:

identifying, by the data security system, a presence or an absence of a same security or information technology event in second event information obtained after obtention of the indication of performance of the security action recommendation.

15. The method of claim 1, further comprising:

obtaining, by the data security system and from one or more computing devices associated with the client account, the security policy.

16. The method of claim 1, further comprising:

generating, by the data security system, the security policy based at least in part on one or more security policies obtained from one or more other client accounts of the data security system.

17. The method of claim 1, wherein the security action recommendation comprises:

a recommendation to isolate an asset;

a recommendation to terminate a process running on an asset;

a recommendation to change an access level of one or more user accounts;

a recommendation to update one or more permissions associated with one or more user accounts;

a recommendation to update a role associated with one or more user accounts;

a recommendation to replace an asset;

a recommendation to add an asset;

a recommendation to move information from one asset to another asset;

a recommendation to perform an update on an asset; or any combination thereof.

18. The method of claim 1, further comprising:

executing, by the data security system, one or more workflows to perform the security action recommendation.

19. The method of claim 1, wherein the natural language response comprises natural language rationale for one or more recommended actions of the security action recommendation.

20. The method of claim 1, further comprising:

providing, to the large language model, training data comprising respective recommended security actions for set of example security or information technology events and associated asset or user information, wherein the security action recommendation or insight is based at least in part on provision of the training data to the large language model.

21. An apparatus, comprising:

a processing system that includes processor circuitry and memory circuitry that stores code, the processing system configured to cause the apparatus to:

obtain, at a data security system, event information for a set of security or information technology events associated with a client account of the data security system;

retrieving, by the data security system and from a data store accessible to the data security system, asset or user information associated with the client account based at least in part on the event information;

filter, by the data security system, the event information and the asset or user information in accordance with a security policy associated with the client account to generate filtered event and asset or user information;

generate, by the data security system and in accordance with the security policy, a prompt that includes the filtered event and asset or user information;

provide the prompt to a large language model; and receive, from the large language model in response to the prompt, a natural language response that includes a security action recommendation or insight for one or more assets or users of the client account for one or more security or information technology events of the set of security or information technology events.

22. A non-transitory computer-readable medium storing code, the code comprising instructions executable by one or more processors to:

obtain, at a data security system, event information for a set of security or information technology events associated with a client account of the data security system;

retrieving, by the data security system and from a data store accessible to the data security system, asset or user information associated with the client account based at least in part on the event information;

filter, by the data security system, the event information and the asset or user information in accordance with a security policy associated with the client account to generate filtered event and asset or user information;

generate, by the data security system and in accordance with the security policy, a prompt that includes the filtered event and asset or user information;

provide the prompt to a large language model; and receive, from the large language model in response to the prompt, a natural language response that includes a security action recommendation or insight for one or more assets or users of the client account for one or more security or information technology events of the set of security or information technology events.

\* \* \* \* \*